US009763219B2

United States Patent
Sun et al.

(10) Patent No.: US 9,763,219 B2
(45) Date of Patent: Sep. 12, 2017

(54) METHOD OF ESTIMATING POSITION OF USER DEVICE

(71) Applicant: SENSEWHERE LIMITED, Edinburgh (GB)

(72) Inventors: Rongze Sun, Edinburgh (GB); Tughrul Sati Arslan, Edinburgh (GB); Zankar Upendrakumar Sevak, Edinburgh (GB); Firas Alsehly, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 245 days.

(21) Appl. No.: 14/412,603

(22) PCT Filed: Jul. 5, 2013

(86) PCT No.: PCT/GB2013/051793
§ 371 (c)(1),
(2) Date: Jan. 2, 2015

(87) PCT Pub. No.: WO2014/006423
PCT Pub. Date: Jan. 9, 2014

(65) Prior Publication Data
US 2015/0195810 A1 Jul. 9, 2015

Related U.S. Application Data

(60) Provisional application No. 61/668,835, filed on Jul. 6, 2012.

(30) Foreign Application Priority Data

Jul. 5, 2012 (GB) .................................. 1211994.7

(51) Int. Cl.
*H04W 64/00* (2009.01)
*G01C 21/12* (2006.01)
(Continued)

(52) U.S. Cl.
CPC .......... *H04W 64/006* (2013.01); *G01C 21/12* (2013.01); *G01C 21/206* (2013.01); *G01C 22/006* (2013.01); *H04W 4/04* (2013.01)

(58) Field of Classification Search
CPC .............................. H04W 64/006; H04W 4/04
(Continued)

(56) References Cited

U.S. PATENT DOCUMENTS 5,583,776 A * 12/1996 Levi ..................... A43B 3/0005
701/300
8,200,251 B2  6/2012  Huang
(Continued)

FOREIGN PATENT DOCUMENTS

DE  10 2008 054 739  6/2010
JP       2004-163168      6/2004
(Continued)

OTHER PUBLICATIONS

International Search Report dated Jan. 22, 2014, issued in PCT/GB2013/051793 (6 pages).

*Primary Examiner* — Cong Tran
(74) *Attorney, Agent, or Firm* — Nixon & Vanderhye P.C.

(57) ABSTRACT

The invention provides a method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position. The (Continued)

method may be used by, for example, a smartphone to estimate its position, particularly where other positioning systems are unavailable.

42 Claims, 5 Drawing Sheets

(51) Int. Cl.
  *G01C 21/20* (2006.01)
  *G01C 22/00* (2006.01)
  *H04W 4/04* (2009.01)
(58) Field of Classification Search
  USPC .......................... 455/456.1, 404.1, 407, 457
  See application file for complete search history.

(56) References Cited

U.S. PATENT DOCUMENTS

| | | | |
|---|---|---|---|
| 8,694,251 B2* | 4/2014 | Janardhanan | G01C 21/165 701/512 |
| 8,700,060 B2 | 4/2014 | Huang | |
| 9,170,124 B2* | 10/2015 | Keene | G01C 22/006 |
| 2003/0191582 A1 | 10/2003 | Terada | |
| 2008/0077326 A1 | 3/2008 | Funk et al. | |
| 2009/0143199 A1 | 6/2009 | Nishibayashi | |
| 2010/0125414 A1 | 5/2010 | Okuyama et al. | |
| 2010/0250134 A1* | 9/2010 | Bornstein | G01C 21/12 701/500 |
| 2010/0324813 A1 | 12/2010 | Sundararajan et al. | |
| 2011/0205125 A1 | 8/2011 | Lin et al. | |
| 2011/0282620 A1* | 11/2011 | Sakuraoka | G01C 21/3423 702/141 |
| 2012/0133555 A1 | 5/2012 | Hyun | |
| 2012/0157123 A1 | 6/2012 | Li et al. | |
| 2013/0090881 A1* | 4/2013 | Janardhanan | G01C 22/006 702/104 |

FOREIGN PATENT DOCUMENTS

| | | |
|---|---|---|
| JP | 2007-279837 | 10/2007 |
| WO | 2009/021068 | 2/2009 |
| WO | 2010/075369 | 7/2010 |
| WO | 2011/047310 | 4/2011 |
| WO | 2011/127659 | 10/2011 |
| WO | 2012/082828 | 6/2012 |

* cited by examiner

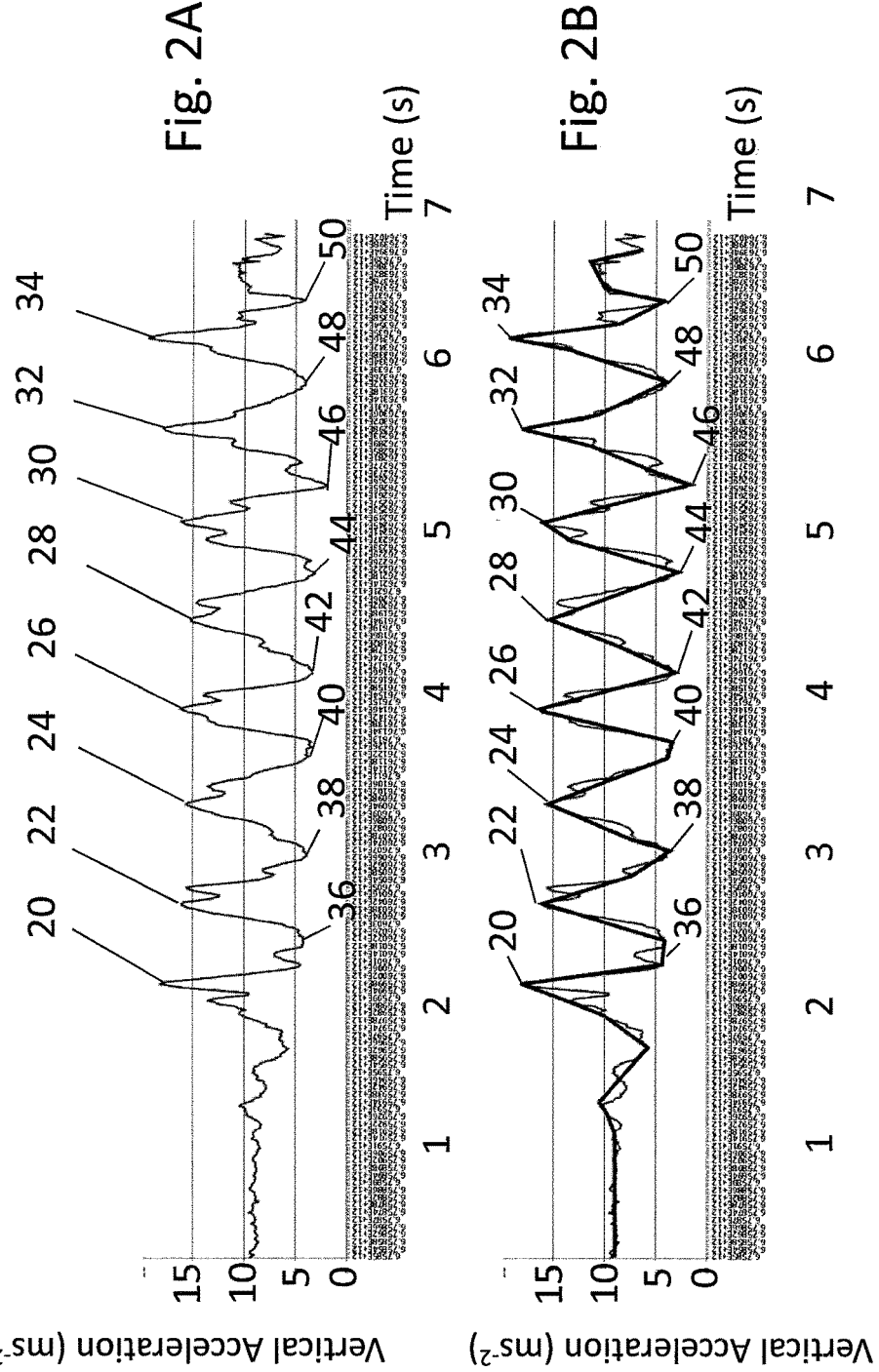

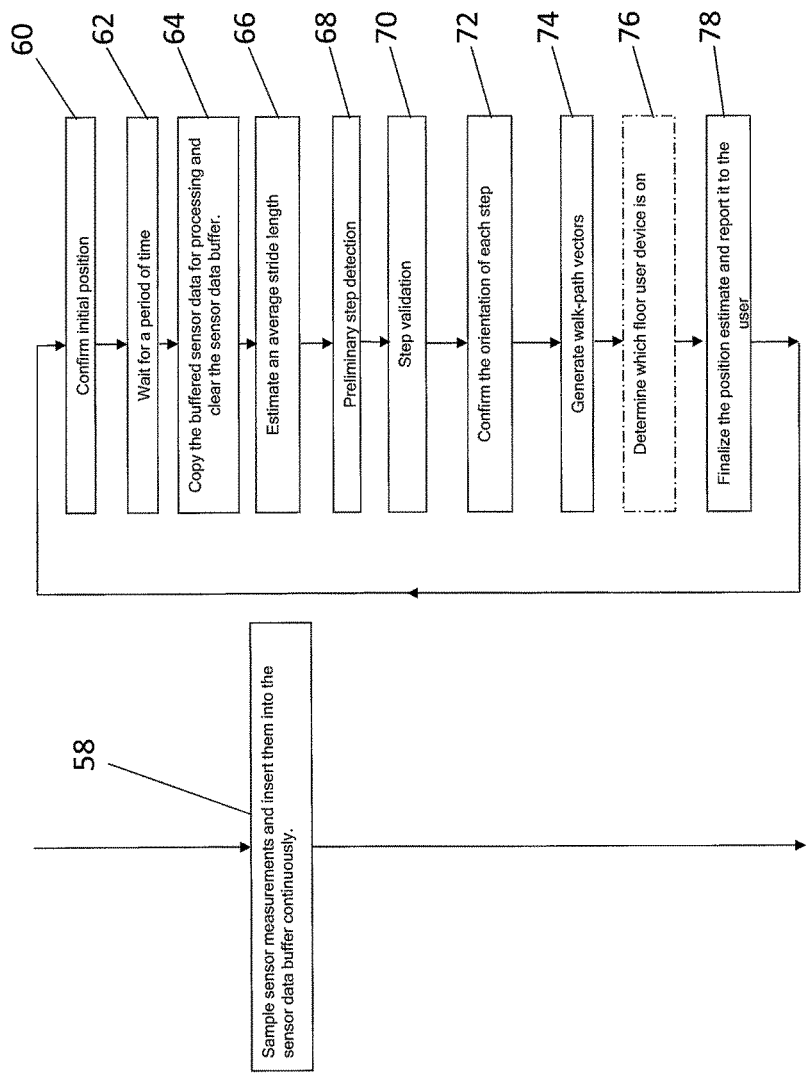

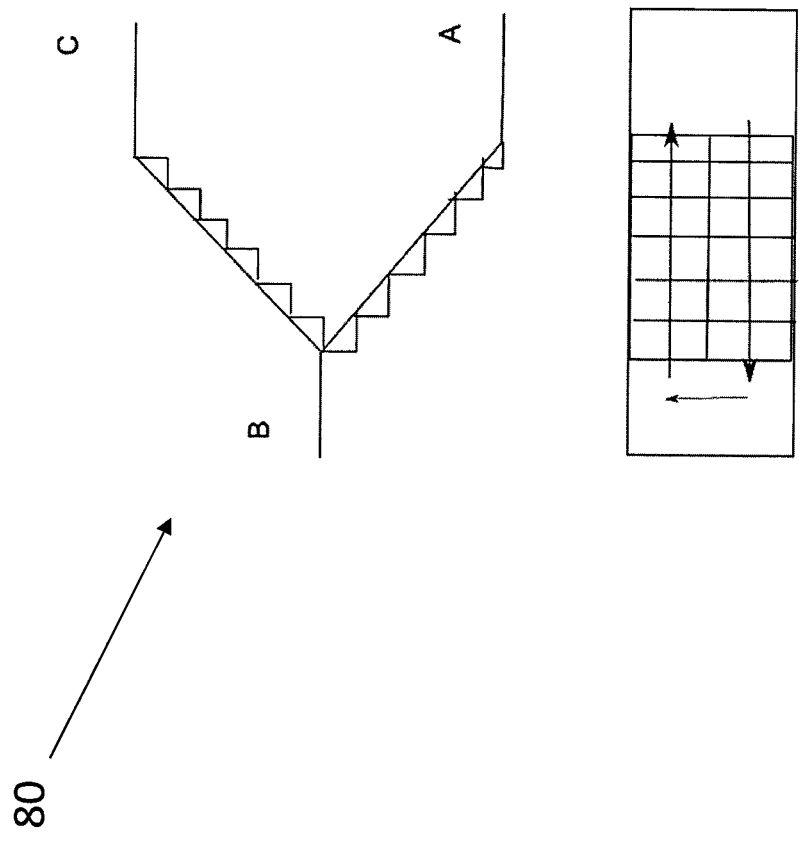

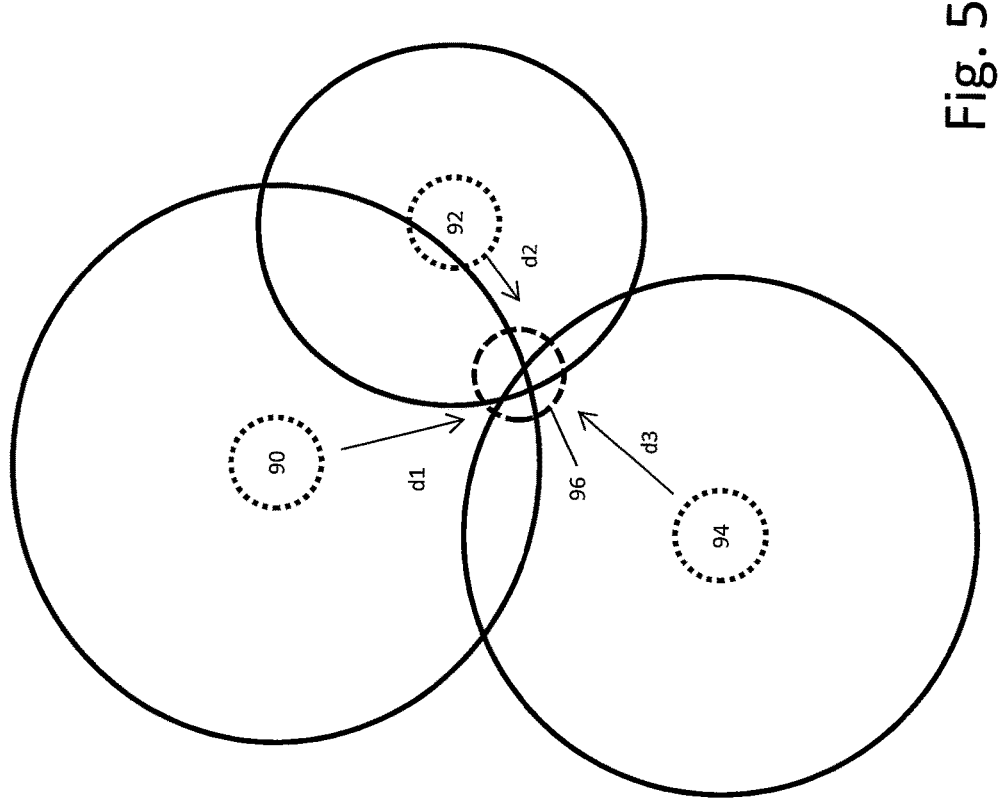

METHOD OF ESTIMATING POSITION OF USER DEVICE

This application is the U.S. national phase of International Application No. PCT/GB2013/051793 filed 5 Jul. 2013 which designated the U.S. and claims priority to GB 1211994.7 filed 5 Jul. 2012, and U.S. Provisional Application No. 61/668,835 filed 6 Jul. 2012, the entire contents of each of which are hereby incorporated by reference.

FIELD OF THE INVENTION

The invention relates to a method of estimating the position of a user device carried by a user and a user device.

BACKGROUND TO THE INVENTION

User devices, such as mobile phones, personal data assistants or tablet computers, may be required to know their position, for example, to operate navigation software and/or other location based services. Such user devices may comprise satellite position system (e.g. Global Positioning System (GPS)) receivers which are operable to receive data from satellites which allow them to identify their position at any given time. However, satellite positioning systems typically require a line of sight between the satellites and the satellite positioning system receiver. When such a line of sight is unavailable, the user device may not be able to determine its position via the satellite positioning system.

In order to overcome this limitation of satellite positioning systems, a user device may be provided with alternative means for estimating its position, typically for use when satellite positioning is unavailable or inaccurate. For example, a user device may be capable of estimating its position using data measured from base stations of a cellular telephone network (e.g. 2G, 3G, 3.5G or 4G mobile communications network) together with a triangulation algorithm. Additionally or alternatively, a user device may be capable of estimating its position using data measured from a number of Wi-Fi access points together with data identifying the position of a plurality of said access points. Data identifying the absolute position of access points typically takes the form of a "map" of access point locations. The memory requirements of such a map may be prohibitively large for some user devices.

In order to avoid having to store large maps on the user device, it may be preferable for a user device to communicate with a central server to obtain the minimum amount of local positioning data required for determining its position at any given time.

Alternatively, the user device may transmit data measured from the Wi-Fi access points it can "see" (i.e. within range of the user device) at any given time to a central server. In this case, the central server may have a memory (or access to a database) containing the positions of the Wi-Fi access points (or best estimates thereof), enabling it to determine the position of the user device when it has received the data measured from the access points. The central server may then transmit the determined position to the user device. This alternative technique also limits the amount of computation required at the user device to obtain an estimate of its position, saving battery power.

A disadvantage of employing a central server is that a working data communication channel must be available between the user device and the server for the positioning system to work.

Commonly, in areas (e.g. tunnels, shopping centres) where a user device cannot obtain access to a data communications network, the line of sight required to enable satellite positioning signal reception may also be unavailable. Accordingly, in these areas, neither positioning system may be operable. It is therefore desirable to develop a new positioning system which would allow a user device to obtain an accurate estimate of its position under these circumstances.

SUMMARY OF THE INVENTION

A first aspect of the invention provides a method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position.

Typically, sensors are provided in the user device to measure the vertical acceleration data and the principal direction data. For example, an accelerometer may be provided to measure vertical acceleration data, and a compass (and optionally a gyroscope) may be provided to determine principal direction data. Note that, for a compass to determine which way the user is moving, the user device will typically need to be held by the user in a particular orientation.

By estimating the position of the user device using data generated by sensors provided in the user device in combination with initial position information, the user device can continue to detect its position in situations where other positioning systems it may be operable to use (e.g. satellite positioning systems such as GPS, wireless access point based positioning systems etc), if any, are unavailable (or if they are not available with a greater accuracy than the updated position deduced from the vertical acceleration and principal direction data).

By generating the motion vector(s) using only validated steps (and not falsely detected steps, which are not used to generate the motion vector) a more accurate estimate of the updated position of the user device can be achieved.

The initial position may be input by the user, determined by an alternative positioning method (e.g. satellite positioning systems such as GPS, Wireless Access Point based positioning systems etc) or previously determined using the method according to the first aspect of the invention.

Typically, the method involves storing or caching the vertical acceleration data, or data derived from the vertical acceleration data, in a memory following the processing performed to detect one or more steps. The stored or cached data may then be used to validate the detection of one or more of said one or more steps.

Preferably, one motion vector is generated per validated step. Alternatively, a plurality of validated steps may be used to generate each motion vector (e.g. to reduce computational requirements).

If a plurality of steps is validated, leading to the generation of a plurality of motion vectors, the step of combining the motion vector(s) with the initial position to estimate an updated position may involve performing a vector addition of a first motion vector with the initial position to derive a first updated position and performing a vector addition of the first updated position with a second (chronologically subsequent) motion vector to derive a second updated position.

Preferably, processing the vertical acceleration data comprises identifying a plurality of local maxima and local minima of vertical acceleration. Local maxima and minima typically indicate that the user carrying the user device has taken one or more steps. Accordingly, a useful first step in detecting one or more steps is to identify the local maxima and minima in the vertical acceleration data.

Preferably, processing the vertical acceleration data comprises low pass filtering the vertical acceleration data.

Low pass filtering the vertical acceleration data helps to remove minor fluctuations in the vertical acceleration data which are not caused by steps taken by the user. Accordingly, low pass filtering typically occurs before identifying local maxima and local minima of vertical acceleration.

The term 'low pass filtering' encompasses both solely low pass filtering and band pass filtering with a suitable pass band.

A step is typically indicated by a transition between a local maximum and a local minimum. More specifically, a local maximum is typically compared with a chronologically subsequent local minimum to detect each step.

Typically, processing the vertical acceleration data further comprises comparing each local maximum with a chronologically adjacent local minimum to detect whether a step has been taken by the user.

Typically, the chronologically adjacent local minimum is both chronologically adjacent and chronologically subsequent to the said local maximum.

By a local maximum being "chronologically adjacent" to a local minimum, we mean that no other local maxima or local minima resulting from a step taken by the user are provided chronologically between said local maximum and local minimum.

Preferably, comparing each local maximum with a chronologically adjacent local minimum comprises comparing a magnitude of each local maximum with a magnitude of a chronologically subsequent local minimum to determine a magnitude difference value and comparing the magnitude difference value with a magnitude threshold value.

Typically the chronologically subsequent local minimum is both chronologically subsequent and chronologically adjacent to the said local maximum.

Typically the magnitude difference value is indicative of whether a transition between a local maximum and a local minimum is due to a step having been taken by the user rather than a more minor fluctuation in the vertical acceleration data.

Typically, if the magnitude difference value is greater than the magnitude threshold value, it is indicative that a step has been taken by the user.

Additionally or alternatively, comparing each local maximum with a chronologically adjacent local minimum may further comprise comparing a chronological index associated with each local maximum with a chronological index associated with a or the chronologically subsequent local minimum to determine a chronological difference value and comparing the chronological difference value with a chronological reference value.

Typically the chronologically subsequent local minimum is both chronologically subsequent and chronologically adjacent to the said local maximum.

The chronological indices are typically time stamps associated with the local maximum and local minimum indicating absolute or relative times when the vertical acceleration data associated with the local maximum and local minimum were measured. However, the chronological indices may alternatively be reference parameters (e.g. numbers) indicating an order in which the vertical acceleration data associated with the local maximum and local minimum were measured.

If the chronological difference value is either greater than or less than the chronological reference value, or greater than a first chronological reference value and less than a second chronological reference value, it can be indicative that the transition is not due to a step having been taken by the user, in which case it may lead to no step being detected from a particular local maximum and minimum.

The comparison of the chronological difference value and the chronological reference value may be an alternative to the comparison of the magnitude difference value to the magnitude threshold value. However, preferably, the comparison of the chronological difference value and the chronological reference value is in addition to the comparison of the magnitude difference value to the magnitude threshold value. If either or both comparisons is/are indicative that a step has not been taken, then no step would be detected. Conversely, if both comparisons are indicative that a step has been taken, a step would be detected.

For each local maximum and local minimum resulting in a step detection, validating the detection of said one or more steps preferably comprises comparing the magnitude of each said local minimum with the magnitude of a chronologically subsequent local maximum to determine a validation magnitude difference value and comparing the validation magnitude difference value to a validation magnitude threshold value.

Preferably, said chronologically subsequent local maximum is chronologically adjacent said local minimum.

Typically, if the validation magnitude difference value is greater than the validation magnitude threshold value, the step is validated. If the validation magnitude difference value is less than the validation magnitude threshold value, the step is typically invalidated.

By comparing the local minimum from which a step has been detected to a chronologically subsequent local maximum which was not used to detect that step, further context is taken into account regarding the movements of the user device which may help to validate or invalidate the detection of the one or more steps.

Additionally or alternatively, for each local maximum and local minimum resulting in a step detection, validating the detection of said one or more steps may comprise comparing a chronological index associated with each said local minimum with a chronological index associated with a chronologically subsequent local maximum to determine a validation chronological difference value and comparing the validation chronological difference value to a validation chronological difference threshold value.

Preferably, said chronologically subsequent local maximum is chronologically adjacent said local minimum.

Typically, if the validation chronological difference value is less than the validation chronological threshold value, the step is validated. If the validation chronological difference value is greater than the validation chronological threshold value, the step is typically invalidated.

By comparing the local minimum from which a step has been detected to a chronologically subsequent local maximum which was not used to detect that step, further context is taken into account regarding the movements of the user device which may help to validate or invalidate the detection of one or more steps.

Again preferably, said chronologically subsequent local maximum is chronologically adjacent said local minimum.

In some embodiments where a plurality of steps is detected, validating the detection of the plurality of steps may additionally or alternatively comprise: determining a normalised chronological index interval between chronologically adjacent steps; comparing chronological index intervals between chronologically adjacent steps with the normalised chronological index interval; and validating the detection of each step if a difference between the normalised chronological index interval and the chronological index interval between that step and a preceding step is within a predetermined range of the normalised chronological index interval and/or the chronological index interval between that step and a subsequent step is within a predetermined range of the normalised chronological index interval.

Typically a step is invalidated (i.e. rejected) if the difference between the normalised chronological index interval and the chronological index interval between that step and a preceding step is not within a predetermined range of the normalised chronological index interval and the chronological index interval between that step and a subsequent step is not within a predetermined range of the normalised chronological index interval.

By comparing the chronological index interval between chronologically adjacent steps with a normalised chronological index interval between chronologically adjacent steps, outlier intervals can readily be identified and the steps associated with the outlier intervals can thus be invalidated before the motion vector is generated. This helps to improve the accuracy of the estimation of the updated position of the user device.

One, two or (preferably) all three of the above validation mechanisms (comparisons with validation magnitude threshold value, validation chronological threshold value and/or normalised chronological index intervals) may be implemented.

Preferably, the method further comprises updating a vertical position of the user. This may be done at the same time as estimating the updated position by combining the motion vector(s) with the initial position, or it may be done separately.

The vertical position may be, for example, a label associated with a floor of a building (e.g. a floor number).

The vertical position may be determined from data manually input by a user. Alternatively, the vertical position may be determined from one or more positioning systems (e.g. GPS, or positioning systems based on processing signals received from electromagnetic signal sources of known position). Alternatively, the vertical position may be determined by processing the vertical acceleration data and the principal direction data, or data derived therefrom. This vertical position may then be used to update the vertical position of the user device.

Accordingly, the method may further comprise updating the vertical position of the user device using the vertical acceleration data and/or the principal direction data, or data derived therefrom.

Preferably, where the method according to the first aspect of the invention comprises generating a plurality of motion vectors, the method may further comprise generating floor change data by comparing two or more of the plurality of motion vectors, or data derived from the said two or more of the plurality of motion vectors, to reference data to determine whether the user device has changed floor within a building (e.g. by climbing or descending a staircase).

The reference data preferably comprises one or more candidate reference patterns, each candidate reference pattern comprising data representing a plurality of motion vectors arranged in a specific order relating to the relative movements required to ascend or descend a particular staircase within the building.

Typically, the step of generating floor change data comprises: comparing said two or more motion vectors to one or more candidate reference patterns comprised in the reference data; determining that said two or more motion vectors conform to one of the one or more candidate reference patterns; and retrieving floor change data associated with said one of the one or more candidate reference patterns from a database of floor change data.

It will be understood that a complete conformance of said motion vectors to the reference pattern is not necessary. In some embodiments, a minimum error (e.g. least squares error) algorithm may be employed to determine which of the reference patterns best matches the motion vectors. In some cases, the minimum error must be less than an error threshold for a conformance to be determined.

In buildings such as shopping centres or office blocks, typically a plurality of floors is provided. Other positioning systems, such as satellite positioning systems are typically unsuitable for determining vertical position data. In addition, although devices such as barometers can be used to approximately determine altitude, they may not be sufficiently accurate to determine whether for example a user has travelled up or down floors within a building. Accordingly, this floor change data can be determined by comparing motion vectors to reference data as described above.

The reference data may be provided to the user device as and when required, preloaded on the user device, or have been determined previously by the user device in combination with, for example, data manually inputted by a user indicating how many floors the user has travelled between.

Preferably, the method additionally comprises processing the vertical acceleration data to determine one or more vertical movement indicators and processing the one or more vertical movement indicators to indicate whether the user device has moved up or down floors within the building.

Typically, vertical movement indicators alone are not sufficiently accurate to determine how many floors a user device has travelled between. However, vertical movement indicators can be typically sufficiently accurate to determine whether a user has travelled up or down. This information therefore can be used in combination with comparing the motion vectors, or data derived from the motion vectors, to reference data in order to determine whether the user device has changed floors.

For example, in one embodiment, the method further comprises enabling an algorithm for comparing said motion vectors to reference data to determine whether the user device has changed floors within a building in response to one or more vertical movement indicators indicating that the user device has moved up or down floors.

This prevents the need for the user device to continuously check motion vectors against reference data, thus saving electrical power and prolonging battery life (where a battery is used to power the user device, as is typically the case when the user device comprises a personal electronic device such as a mobile smartphone).

If said motion vectors conform to one of the reference patterns in the reference data, it may be determined that the user device has ascended or descended a specific staircase within the building and the vertical position of the user device can be updated accordingly.

Preferably the floor change data is used to update the vertical position of the user device.

The vertical position may be, for example, a label associated with a floor of a building (e.g. a floor number). In this way, the estimated position of the user device can take into account floor changes.

Preferably, the initial position comprises initial floor information indicating which floor the user device is on initially, and the floor change data is processed together with the initial floor information to determine which floor the user has moved to.

The reference patterns may be provided to the user device from a database of reference data. Additionally or alternatively, the user device may generate reference patterns for storage in a database of reference data.

Accordingly, the method may further comprise: determining that the user device has changed floors within a building; and generating a reference pattern representative of the floor change performed by the user device by identifying and storing two or more motion vectors generated in respect of validated steps taken by the user during said floor change.

In this case, the floor change may be determined, for example, from data manually input by the user; or from another positioning system such as a satellite positioning system (e.g. GPS) or an electromagnetic signal source based positioning system.

In one embodiment, the step of determining that the user device has changed floors within a building comprises: receiving one or more electromagnetic signals identifying one or more electromagnetic signal sources or a vertical position from which the electromagnetic signal(s) were transmitted; and processing the received electromagnetic signals to determine the vertical position(s) of said one or more electromagnetic signal sources.

Where the electromagnetic signal(s) may comprise (an) identifier(s) of the electromagnetic signal source(s), the method may further comprise obtaining the vertical position(s) of the electromagnetic signal source(s) from a database of electromagnetic signal source positions. It will be understood that such a database would comprise electromagnetic signal source identifiers associated with corresponding electromagnetic signal source positions.

It will also be understood that the motion vectors generated in respect of validated steps taken by the user during said floor change, or data derived therefrom, may be used as a reference pattern.

Determining that the user device has changed floors typically comprises comparing a current vertical position of the user device with the vertical position(s) of the electromagnetic source(s).

Reference patterns may be generated for a number of floor changes of the user device and stored in a database of reference data for subsequent use by the or another user device to determine whether said user device has changed floors.

Optionally the method may further comprise updating the vertical position of the user device using the vertical position(s) of the one or more electromagnetic signal sources.

Preferably, the method further comprises processing the vertical acceleration data to determine an average stride length of the user and using the average stride length to generate the motion vector.

It has been found that estimating the average stride length of the user in this way is more accurate than simply using a predetermined estimate of stride length.

Preferably, the method further comprises updating an estimated position of the user device using an alternative positioning method when said alternative positioning method is available and meets one or more accuracy criteria.

A position estimated using the alternative positioning method may be used as the initial position in a subsequent performance of the method according to the first aspect of the invention.

Over time, the estimate of the user's position may decrease in accuracy due to errors in step detection, errors in stride length estimation and errors in the estimation of the direction of travel of the user. Accordingly when a more accurate alternative positioning method (such as GPS, a positioning system based on receiving signals from electromagnetic signal sources whose position is known, or even a manually input position), is available, it may be used to reset the position of the user device.

The accuracy criteria may comprise one or more absolute accuracy criteria (e.g. accurate to within a predetermined distance) and/or one or more relative accuracy criteria (e.g. relative to the accuracy of (typically more accurate than) an updated position of the user device, such as a current updated position of the user device).

A typical (relative) accuracy criterion is that the alternative positioning method is available to the user device and is more accurate than an estimated accuracy of estimating the position of the user device using an initial position and vertical acceleration and principal directional data as described above.

In one embodiment, the method involves estimating an accuracy of the updated position; determining an estimated accuracy of the alternative positioning method; comparing the estimated accuracies of the updated position and the alternative positioning method; and updating an estimated position of the user device using the alternative positioning method in response to the estimated alternative positioning method having an estimated accuracy greater than the estimated accuracy of the updated position.

Preferably, the estimated position of the user device is updated using the alternative positioning method in response to the alternative positioning method having an estimated accuracy greater than the accuracy of the updated position by a predetermined threshold amount.

The threshold amount may be customisable, for example by a user.

Preferably, the method comprises: validating an estimated position of the user device determined using the alternative positioning method; and updating an estimated position of the user device using the alternative positioning method in response to successful validation of the estimated position of the user device determined using the alternative positioning method. This provides an additional or alternative check that the alternative positioning method is sufficiently accurate before a position estimated using the alternative positioning method is prioritised over the updated position.

In one embodiment, when an alternative positioning method meeting the one or more accuracy criteria is available, the method may further comprise comparing a position of the user device estimated by the alternative positioning method to the updated position of the user device (i.e. estimated using vertical acceleration and principal direction data together with an initial position) to determine one or more accuracy measurements of the updated position, and adjusting the magnitude and/or chronological threshold values and/or an or the estimated average stride length of the user if the accuracy measurement(s) fail(s) one or more second accuracy criteria.

The comparison of the position of the user device estimated by the alternative positioning method to the updated position of the user device may be direct or indirect.

Preferably, the step of adjusting the magnitude and/or chronological threshold values and/or an or the estimated average stride length of the user comprises comparing the position of the user device estimated by the alternative positioning method to the initial position to determine a first difference value and comparing the updated position to the initial position to determine a second difference value and comparing the first difference value to the second difference value.

This enables a determination to be made as to whether the distance of travel estimated by the motion vectors is greater than or less than the distance of travel of the user, which in turn enables the magnitude and/or chronological threshold values and/or an or the estimated average stride length of the user to be adjusted accordingly.

Preferably, the method further comprises: determining an absolute accuracy measurement of the alternative positioning method; and adjusting the magnitude and/or chronological threshold values and/or an or the estimated average stride length of the user in response to a determination that the absolute accuracy measurement meets one or more absolute accuracy criteria.

This helps to ensure that the alternative positioning method is sufficiently accurate to facilitate an improved estimate of the magnitude and/or chronological threshold values and/or an or the estimated average stride length of the user.

Typically, the one or more accuracy measurements comprise a measurement of the distance (and optionally a measurement of the direction) from the position estimated by the alternative positioning method, and the one or more second accuracy criteria comprises a threshold distance value (and optionally a threshold direction value). If the accuracy measurement is (are) less than the threshold distance (and optionally threshold direction) values, the magnitude and chronological threshold values may be left unchanged. However, if the accuracy measurement(s) is (are) greater than the threshold distance (and optionally threshold direction) values, the magnitude and chronological threshold values and/or an or the estimated average stride length of the user may be adjusted accordingly.

Preferably, the method further comprises validating the position estimated by the alternative positioning method before adjusting the magnitude and/or chronological threshold values and/or an or the estimated average stride length of the user.

The magnitude and/or chronological threshold values and/or average estimated stride length of the user may be updated iteratively over time to improve the accuracy of the updated position.

In one embodiment, the method according to the first aspect of the invention may further comprise receiving one or more signals from an electromagnetic signal source (such as a Wireless Access Point, WAP), processing the one or more received signals to estimate a position of the electromagnetic signal source using the updated position and creating, updating or correcting a database of electromagnetic signal source positions using the estimated position of the electromagnetic signal source.

Most typically the user device receives one or more signals from the electromagnetic signal source at each of a plurality (preferably each of three or more) of locations, said signals being processed to estimate the position of the electromagnetic signal source using the (and optionally a corresponding plurality of) updated position(s). It will be understood that, at some of the plurality of locations, other positioning systems may be used to determine the position of the user device. However, alternatively, the positioning system according to the first aspect of the invention may be employed to determine the position of the user device at each of the plurality of locations. In this case, the method may further comprise repeating the method according to the first aspect of the invention a plurality of times to estimate a corresponding plurality of updated positions of the user device, said plurality of updated positions being used to estimate the position of the electromagnetic signal source.

In some situations (e.g. where one or more signals have been detected from the electromagnetic signal source previously), one signal received from an electromagnetic signal source by the user device at a single location may be sufficient to update or correct the database.

In one embodiment, the database comprises a map of electromagnetic signal source positions, and the map is updated or corrected using the estimated position of the electromagnetic signal source.

Typically, the method involves receiving one or more signals from each of a plurality of electromagnetic signal sources and estimating positions of each of the plurality of electromagnetic signal sources using said signals and the (or a corresponding plurality of) updated position(s).

Preferably, the user device receives one or more signals from each of the plurality of electromagnetic signal sources at each of a plurality (preferably each of three or more) of locations, said signals being processed to estimate the positions of the electromagnetic signal sources using the (or a corresponding plurality of) updated position(s). As above, the position of the user device at some of the plurality of locations may be determined using other positioning systems (e.g. satellite positioning systems). However, alternatively, the positioning system according to the first aspect of the invention may be employed to determine the position of the user device at each of the plurality of locations. In this case, the method may further comprise repeating the method according to the first aspect of the invention a plurality of times to estimate a corresponding plurality of updated positions of the user device, said plurality of updated positions being used to estimate the positions of the electromagnetic signal sources.

The estimated position(s) of the electromagnetic signal source(s) (or alternatively the signals received by the user device from the electromagnetic signal source(s) together with the updated position(s)) may be transmitted to a server over a data communications network, the database of electromagnetic signal source(s) being corrected, created or updated at the server.

Thus, the method may involve both navigation and mapping of electromagnetic signal source positions using the vertical acceleration and principal direction data.

Typically the method according to the first aspect of the invention is performed by the user device.

The invention also extends to a non-transitory computer readable medium retrievably storing computer readable code for causing a computer to perform the steps of the method according to the first aspect of the invention.

It will be understood that the term "non-transitory computer-readable medium" does not extend to a signal per se.

A second aspect of the invention provides a user device comprising a vertical acceleration measurement module operable to measure a vertical acceleration of the user device; an orientation measurement module operable to measure an orientation of the user device; and a controller in electronic communication with the vertical acceleration and orientation measurement modules, the controller being operable to: process vertical acceleration data generated by the vertical acceleration module to detect one or more steps taken by the user, and to subsequently validate the detection of one or more of said one or more steps; generate one or more motion vectors in respect of the validated steps taken by the user using principal direction data generated by the orientation measurement module; and estimate an updated position of the user device by combining the motion vector(s) with an initial position of the user device.

Preferably the user device further comprises an alternative positioning system module in electronic communication with the controller for estimating a position of the user device.

Preferably, the alternative positioning system module comprises a satellite positioning system receiver.

Preferably, the alternative positioning system module comprises an electromagnetic signal receiver.

Typically, the user device further comprises a memory in electronic communication with the controller. The vertical acceleration and principal direction data may be stored or cached in the memory.

Typically, the vertical acceleration measurement module comprises an accelerometer.

Typically the orientation measurement module comprises a compass. Optionally the orientation measurement module further comprises a gyroscope.

The controller may be a microprocessor, but is more typically a microcontroller.

A third aspect of the invention provides a method of estimating the position of a user device carried by a user, the method comprising: measuring an acceleration of the user device, thereby generating acceleration data; measuring a direction of movement of the user device, thereby generating direction data; processing the acceleration data to detect two or more steps taken by the user; generating two or more motion vectors relating to two or more of the detected steps taken by the user taking into account the direction data; and generating floor change data by comparing the said two or more motion vectors, or data derived from the said two or more motion vectors, with reference data to determine whether the user device has changed floors within a building.

By determining whether a user device has changed floors within a building using the generated motion vectors, floor change data can be generated from measured relative movements of the device without needing an estimate of the absolute position of the device.

The method may further comprise providing an initial position of the user device. The initial position may be input by the user, determined by an alternative positioning method (e.g. satellite positioning systems such as GPS, Wireless Access Point based positioning systems etc) or previously determined using the method according to the third aspect of the invention.

The method may comprise estimating an updated position of the user device by combining one or more of the generated motion vectors with the initial position. The method may further comprise generating floor change data taking into account the initial position and/or the estimated updated position of the user device. Accordingly, it may be that both the position of the device (e.g. the initial position or one or more updated positions of the device) and its movements are taken into account to determine whether a user device has changed floors within a building. This provides a more accurate way of determining whether the device has changed floors within a building than using the position alone or the motion vectors alone.

Preferably, the initial position comprises initial floor information indicating which floor the user device is on initially, and the floor change data is processed together with the initial floor information to determine which floor the user has moved to.

The floor change data is typically data indicating that the device has changed floors within a building.

The method may comprise measuring the lateral acceleration of the user device. The method may comprise measuring the anterior/posterior acceleration of the user device. The method may comprise measuring the vertical acceleration of the user device. The method may comprise measuring two or more of: the lateral acceleration of the user device, the anterior/posterior acceleration of the user device and the vertical acceleration of the device.

Accordingly, the acceleration data may comprise lateral acceleration data. The acceleration data may comprise anterior/posterior acceleration data. The acceleration data may comprise vertical acceleration data. The acceleration data may comprise a combination of two or more of: lateral acceleration data, anterior/posterior acceleration data and vertical acceleration data.

The step of measuring the direction of movement of the user device may comprise measuring an orientation of the user device. The step of measuring the direction of movement of the user device may comprise measuring an orientation of the user device and assuming that the device is moving in a direction derived from the measured orientation of the user device (e.g. it may be assumed that the device is moving in the direction in which the user device is oriented).

The said direction data generated may be principal direction data.

Preferably, one motion vector is generated per detected (or validated detected—see below) step. Alternatively, a plurality of detected (or validated detected—see below) steps may be used to generate each motion vector (e.g. to reduce computational requirements).

The method may further comprise validating the detected steps taken by the user. The method may thus comprise determining which of the detected steps are validated steps and which of the detected steps are invalidated steps.

The method may further comprise generating the said motion vectors in respect of the validated steps taken by the user using the direction data (and not typically in respect of the invalidated steps).

The reference data may comprise two or more reference vectors.

Typically the method comprises: determining that the user device has changed floors (or that the user device is changing floors) within a building responsive to a determination that the said motion vectors match the said reference data.

Typically the reference data comprises one or more candidate reference patterns, each candidate reference pattern comprising data representing a plurality of motion vectors arranged in a specific order relating to the relative movements required to change (e.g. to move up or down between specific) floors (e.g. by ascending or descending a particular staircase/escalator/moving walkway) within the building.

Typically the motion vectors within at least one of the reference patterns comprise two or more motion vectors extending at an angle with respect to each other. Typically the motion vectors within at least one of the reference patterns comprise two or more motion vectors extending at an angle of at least 90° to each other. The motion vectors within at least one of the reference patterns comprise may comprise two or more reference vectors extending at an angle of between 170° and 190° to each other.

It will be understood that a complete conformance of said motion vectors to the reference pattern is not necessary for a match to be determined. In some embodiments, a minimum error (e.g. least squares error) algorithm may be employed to determine which of the reference patterns best matches the motion vectors. In some cases, the minimum error must be less than an error threshold for a conformance to be determined.

In buildings such as shopping centres or office blocks, typically a plurality of floors is provided. Other positioning systems, such as satellite positioning systems are typically unsuitable for determining vertical position data. In addition, although devices such as barometers can be used to approximately determine altitude, they may not be sufficiently accurate to determine whether for example a user has travelled up or down floors within a building. Accordingly, this floor change data can be determined by comparing motion vectors to reference data as described above.

The reference data may be provided to the user device as and when required, preloaded on the user device, or have been determined previously by the user device in combination with, for example, data manually inputted by a user indicating how many floors the user has travelled between.

It may be that the step of generating floor change data comprises: comparing said two or more generated motion vectors to one or more candidate reference patterns comprised in the reference data; determining that said two or more generated motion vectors conform to one of the one or more candidate reference patterns; and obtaining floor change data associated with said one of the one or more candidate reference patterns from a database of floor change data.

The method may further comprise processing the acceleration data to determine one or more vertical movement indicators and processing the one or more vertical movement indicators to indicate whether the user device has moved up or down floors within the building.

The method may further comprise: enabling an algorithm for comparing said two or more generated motion vectors to reference data to determine whether the user device has changed floor within a building in response to one or more vertical movement indicators indicating that the user device has moved up or down floors.

The method may further comprise using the generated floor change data to update an estimated vertical position of the user device.

The method may further comprise displaying the estimated vertical position on the user device.

The vertical position may be, for example, a label associated with a floor of a building (e.g. a floor number). In this way, the estimated position of the user device can take into account floor changes.

The user device may generate reference patterns for storage in a database of reference data.

Accordingly, the method may further comprise: determining that the user device has changed floors within a building; and generating a reference pattern representative of the floor change performed by the user device by identifying and storing two or more motion vectors generated in respect of detected (validated) steps taken by the user during said floor change.

In this case, the floor change may be determined, for example, from data manually input by the user; or from another positioning system such as a satellite positioning system (e.g. GPS) or an electromagnetic signal source based positioning system.

In one embodiment, the step of determining that the user device has changed floors within a building comprises: receiving one or more electromagnetic signals identifying one or more electromagnetic signal sources or a vertical position from which the electromagnetic signal(s) were transmitted; and processing the received electromagnetic signals to determine the vertical position(s) of said one or more electromagnetic signal sources.

Where the electromagnetic signal(s) may comprise (an) identifier(s) of the electromagnetic signal source(s), the method may further comprise obtaining the vertical position(s) of the electromagnetic signal source(s) from a database of electromagnetic signal source positions. It will be understood that such a database would comprise electromagnetic signal source identifiers associated with corresponding electromagnetic signal source positions.

It will also be understood that the motion vectors generated in respect of (validated) steps taken by the user during said floor change, or data derived therefrom, may be stored and used as a reference pattern.

Determining that the user device has changed floors typically comprises comparing a current vertical position of the user device with the vertical position(s) of the electromagnetic source(s).

Reference patterns may be generated for a number of floor changes of the user device and stored in a database of reference data for subsequent use by the or another user device to determine whether said user device has changed floors.

Optionally the method may further comprise updating the vertical position of the user device using the vertical position(s) of the one or more electromagnetic signal sources.

The invention also extends to a non-transitory computer readable medium retrievably storing computer readable code for causing a computer to perform the steps of the method according to the third aspect of the invention.

It will be understood that the term "non-transitory computer-readable medium" does not extend to a signal per se.

Typically the method according to the third aspect of the invention is performed by the user device.

A fourth aspect of the invention provides a user device comprising an acceleration measurement module configured to measure an acceleration of the user device; a direction measurement module configured to measure a direction of movement of the user device, thereby generating direction data; and a controller in electronic communication with the acceleration and direction measurement modules, the controller being configured to: process acceleration data generated by the acceleration module to detect two or more steps taken by the user; generate two or more motion vectors in respect of two or more of the detected steps taken by the user using the direction data generated by the direction measurement module; and to generate floor change data by comparing the said two or more motion vectors, or data derived from the said two or more motion vectors, with reference data to determine whether the user device has changed floors within a building.

By determining whether a user device has changed floors within a building using the generated motion vectors, floor change data can be generated from measured relative movements of the device without needing an estimate of the absolute position of the device.

The controller may be configured to estimate an updated position of the user device by combining one or more of the generated motion vectors with an initial position of the device. The initial position may be input by the user, determined by an alternative positioning method (e.g. satellite positioning systems such as GPS, Wireless Access Point based positioning systems etc) or previously determined using the method according to the third aspect of the invention.

The controller may be configured to generate floor change data taking into account the initial position and/or the estimated updated position of the user device. Accordingly, it may be that both the position (e.g. the initial or one or more updated positions) of the device and its movements are taken into account to determine whether a user device has changed floors within a building. This provides a more accurate way of determining whether the device has changed floors within a building than using the position alone or the motion vectors alone.

The acceleration measurement module may comprise an accelerometer. The acceleration measurement module may comprise a one, two or three axis accelerometer.

The acceleration measurement module may be configured to measure the lateral acceleration of the user device. The acceleration measurement module may be configured to measure the anterior/posterior acceleration of the user device. The acceleration measurement module may be configured to measure the vertical acceleration of the user device. The acceleration measurement module may be configured to measure two or more of: the lateral acceleration of the user device, the anterior/posterior acceleration of the user device and the vertical acceleration of the device.

Accordingly, the acceleration data may comprise lateral acceleration data. The acceleration data may comprise anterior/posterior acceleration data. The acceleration data may comprise vertical acceleration data. The acceleration data may comprise a combination of two or more of: lateral acceleration data, anterior/posterior acceleration data and vertical acceleration data.

The direction measurement module may comprise a compass and/or a gyroscope. Additionally or alternatively the direction measurement module may comprise an accelerometer (e.g. a one, two or three axis accelerometer). The acceleration measurement module may share an accelerometer with the direction measurement module.

The direction measurement module may be configured to measure an orientation of the user device. The step of measuring the direction of movement of the user device by the direction measurement module may comprise measuring an orientation of the user device and assuming that the device is moving in a direction derived from the measured orientation of the user device (e.g. it may be assumed that the device is moving in the direction in which the user device is oriented).

The said direction data generated may be principal direction data.

The controller may be further configured to validate the detected steps taken by the user. The controller may be further configured to determine which of the detected steps are validated steps and which of the detected steps are invalidated steps.

The controller may be further configured to generate the said motion vectors in respect of the validated steps taken by the user using the direction data (and not typically in respect of the invalidated steps).

The reference data may comprise reference vectors. The reference data may be stored in a database of reference data (e.g. stored on the user device).

Typically the controller is configured to: determine that the user device has changed floors (or that the user device is changing floors) within a building responsive to a determination that the said motion vectors match the said reference data.

The reference data may comprise one or more candidate reference patterns, each candidate reference pattern comprising data representing a plurality of motion vectors arranged in a specific order relating to the relative movements required to change (e.g. to move up or down between specific) floors (e.g. by ascending or descending a particular staircase/escalator/moving walkway) within the building.

Typically the motion vectors within at least one of the reference patterns comprise two or more motion vectors extending at an angle with respect to each other. Typically the motion vectors within at least one of the reference patterns comprise two or more motion vectors extending at an angle of at least 90° to each other. The motion vectors within at least one of the reference patterns comprise may comprise two or more reference vectors extending at an angle of between 170° and 190° to each other.

The controller is preferably configured to generate floor change data by: comparing said two or more generated motion vectors to one or more candidate reference patterns comprised in the reference data; determining that said two or more generated motion vectors conform to one of the one or more candidate reference patterns; and obtaining floor change data associated with said one of the one or more candidate reference patterns from a database of floor change data.

The controller may be configured to process the acceleration data to determine one or more vertical movement indicators and to process the one or more vertical movement indicators to indicate whether the user device has moved up or down floors within the building.

The controller may be configured to: enable (e.g. run) an algorithm for comparing said two or more generated motion vectors to reference data to determine whether the user device has changed floor within a building in response to one or more vertical movement indicators indicating that the user device has moved up or down floors.

The controller may be configured to use the generated floor change data to update an estimated vertical position of the user device.

The user device may comprise a display. The controller may be configured to display the estimated vertical position on the display of the user device.

Preferably the user device further comprises an alternative positioning system module in electronic communication with the controller for estimating a position of the user device.

Preferably, the alternative positioning system module comprises a satellite positioning system receiver.

Preferably, the alternative positioning system module comprises an electromagnetic signal receiver.

Typically, the user device further comprises a memory in electronic communication with the controller. The acceleration and direction data may be stored or cached in the memory.

The controller may be a microprocessor, but is more typically a microcontroller.

Although the embodiments of the invention described with reference to the drawings comprise methods performed by computer apparatus, and also computing apparatus, the invention also extends to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc or hard disc. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

The preferred and optional features discussed above are preferred and optional features of each aspect of the invention to which they are applicable. For the avoidance of doubt, the preferred and optional features of the first aspect of the invention may also be preferred and optional features in relation to the second, third, and fourth aspects of the invention, where applicable (and vice versa).

DESCRIPTION OF THE DRAWINGS

An example embodiment of the present invention will now be illustrated with reference to the following Figures in which:

FIGS. 2A and 2B show plots of vertical acceleration versus time, the vertical acceleration data being measured by the accelerometer of the smartphone of FIG. 1, FIG. 2A showing the raw data only and FIG. 2B showing both the raw data and low pass filtered data;

FIGS. 3A and 3B are flow charts illustrating a method of estimating the position of the user device of FIG. 1;

FIGS. 4A and 4B are side and plan schematic views respectively of a staircase and FIG. 4C shows a reference pattern associated with the staircase which can be used by the user device to determine whether it has ascended or descended the staircase; and FIG. 5 illustrates the mapping of an electromagnetic signal source position using triangulation.

DETAILED DESCRIPTION OF AN EXAMPLE EMBODIMENT

Figure 1:
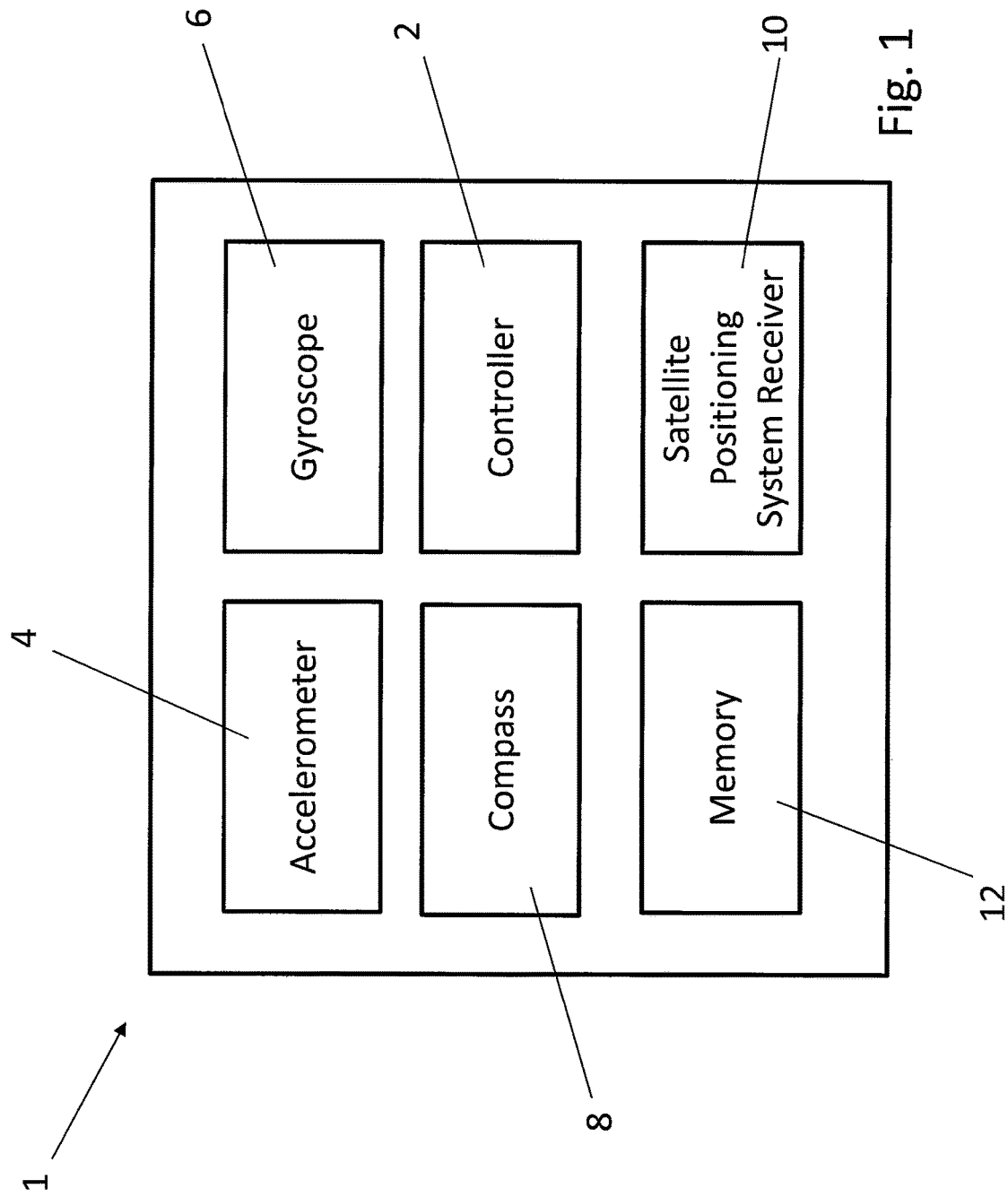
FIG. 1 is a block diagram of a user device having a plurality of internal sensors which can be used to estimate its position.

FIG. 1 is a block diagram of a user device 1, such as a mobile smart phone, PDA or tablet computer, comprising a controller 2 (such as a microcontroller or microprocessor) in electronic communication with an accelerometer 4 operable to measure the vertical acceleration of the user device 1, a gyroscope 6, compass 8, a satellite positioning system (e.g. GPS) receiver 10 and a memory 12. When a line of sight is available between the receiver 10 and the three satellites required for satellite positioning, the controller 2 may process satellite positioning data received by the receiver 10 to estimate a position of the user device 1. However, as explained below, the user device 1 may additionally or alternatively estimate its position using vertical acceleration data measured by the accelerometer 4 and directional data measured by the compass 8 and optionally the gyroscope 6.

FIG. 2A is a plot of vertical acceleration data versus time as measured by the accelerometer 4 when a user walks or runs carrying the user device 1. The plot shown in FIG. 2A has eight local maxima 20-34 and eight local minima 36-50. Each transition between a local maximum 20-34 and a chronologically subsequent and adjacent local minimum 36-50 is caused by a step taken by the user. Accordingly, the accelerometer 4 can be used as a pedometer, where steps taken by the user can be detected by processing the vertical acceleration data to extract the local maxima and minima. However as shown in FIG. 2A, the raw vertical acceleration data measured by the accelerometer 4 also comprises fluctuations in vertical acceleration which are not caused by steps taken by the user. In order to remove these fluctuations, the vertical acceleration data may low pass filtered. The low pass filtered vertical acceleration data is shown by the heavier line in FIG. 2B. It can be seen from FIG. 2B that the local maxima 20-34 and local minima 36-50 are more clearly defined following low pass filtering. This in turn makes the local maxima and minima, and therefore steps taken by the user, easier to extract from the vertical acceleration data.

Note that the vertical acceleration data shown on FIGS. 2A and 2B fluctuates around 9.81 ms$^{-2}$ due to the effect of gravity.

FIGS. 3A and 3B are flow charts illustrating a method of estimating the position of the user device 1 which may be executed by the controller 2 using the vertical acceleration data measured by the accelerometer 4 and directional data measured by the compass 8 (and optionally the gyroscope 6). The processes of FIGS. 3A and 3B are performed in parallel.

FIG. 3A consists of the single step 58 of continuously sampling data measurements from the accelerometer 4 and the compass 8 and typically the gyroscope 6 and buffering the raw measurement data in a buffering section of the memory 12. Each vertical acceleration measurement made by the accelerometer 4 and each directional measurement made by the compass 8 and typically data measured by the gyroscope 6 are chronologically indexed by the controller. It will be understood that the chronological index may be a relative or absolute time stamp, or simply an indicator of a chronological order in which the data is measured.

In a first step 60 of FIG. 3B, an initial position of the user device 1 is provided. This initial position may be determined by the controller 2 from satellite positioning signals received by the satellite positioning receiver 10. Alternatively, the initial position may be determined from a previous performance of the method described by FIGS. 3A and 3B or by any other suitable positioning system which may be available to the user device 1 (such as a system of estimating the position of the user device 1 using signals from Wi-Fi or Bluetooth Wireless Access Points together with their known positions).

In a second step 62, the controller 2 waits for a predetermined time period, during which the buffer section of the memory 12 is populated with raw measurement data buffered from the accelerometer 4, the compass 8 (and typically the gyroscope 6). The predetermined time period may be set; alternatively predetermined time period may be customisable by a user of the user device 1.

In a third step 64, the controller 2 copies the buffered sensor data to a processing section of the memory 12 for processing, and clears the buffer section of the memory 12 so that the buffer section can store new sensor data received by the accelerometer 4, compass 8 and gyroscope 6.

In a next step 66, an average stride length of the user over the predetermined time period is estimated by the controller 2. In order to estimate the average stride length of the user, the following formula may be used:

$$\text{Stride\_length} = ((A_{max} - A_{min})/(A_{avg} - A_{min})) * C$$

where:

$A_{max}$ is the average (typically mean) magnitude of the greatest 10% by magnitude of the vertical acceleration measurements;

$A_{min}$ is the average (typically mean) magnitude of the lowest 10% by magnitude of the vertical acceleration measurements;

$A_{avg}$ is the average (typically mean) magnitude of all of the vertical acceleration measurements; and C is a fixed co-efficient which may be determined empirically. Typically, a value of 0.25 is suitable, and provides most accurate results for an actual stride length of between 500 mm and 600 mm.

This formula provides an effective trade-off between accuracy and efficient power consumption by the controller 2.

At a next step 68, preliminary step detection is performed. In order to detect one or more steps taken by the user carrying the user device 1, firstly, as described above, the controller 2 low pass filters the vertical acceleration data to remove fluctuations in vertical acceleration data not caused by steps taken by the user. Next, the controller 2 identifies the local maxima and local minima of the filtered vertical acceleration data and stores their magnitudes and chronological indices in memory 12. For the purposes of the following discussion it will be assumed that the filtered acceleration data is identical to the example shown in FIG. 2B and thus has eight local maxima 20-34 and eight local minima 36-50. In order to determine whether a step may have been taken by the user, the controller 2 compares each local maximum with a chronologically adjacent and subsequent local minimum.

Firstly, the magnitude of each local maximum is compared with the magnitude of the chronologically adjacent and subsequent local minimum to determine a magnitude difference value. For example with reference to FIG. 2B, the magnitude of local maximum 20 is approximately 17 ms$^{-2}$ while the magnitude of the chronologically adjacent and subsequent local minimum 36 is approximately 4.5 ms$^{-2}$. Accordingly the magnitude difference value is 13.5 ms$^{-2}$.

Secondly, the chronological index (in the example shown in FIGS. 2A and 2B, the chronological index is a relative time stamp) of each local maximum is compared with the chronological index of the chronologically subsequent local minimum to determine a chronological difference value. In the example referred to above the chronological index associated with the local maximum 20 is approximately 2.1 seconds while the chronological index associated with local minimum 36 is approximately 2.4 seconds. Accordingly the chronological difference between the local maximum 20 and local minimum 36 is approximately 300 ms. This chronological index is stored in memory 12.

Next, a relationship table, such as the following, may be used to estimate whether or not a step has been taken by the user:

| D = |max| − |min| | T = time$_{trough}$ − time$_{peak}$ | Detection? |
|---|---|---|
| D > 4.5 | T < 500 ms | yes |
| 3 < D < 4.5 | 97 ms < T < 500 ms | yes |
| D < 3 | | no | where D is the magnitude difference value and T is the chronological difference value.

Thus when D is greater than a magnitude threshold value, in this case 4.5 ms$^{-2}$, and T is less than a chronological reference value, in this case 500 ms, a step is detected from the local maximum and the local minimum. If either of these conditions is not met, the second test described on the second line of the relationship table is performed. That is if D is between first and second magnitude threshold values 3 ms$^{-2}$ and 4.5 ms$^{-2}$, and T is between first and second chronological reference values 97 ms and 500 ms, a step is detected from the local maximum and the local minimum. If neither of these conditions are met, no step is detected from that local maximum and local minimum combination. It will be understood that other (more or less) complex tests may be performed in the preliminary step detection process 68.

It will be understood that, in some embodiments, only the magnitude, or chronological index of chronologically adjacent local maxima and minima may be compared to determine whether a step may have been taken by the user. However, preferably both the magnitudes and chronological indices are compared.

The chronological index associated with each detected step is the chronological index of the local minimum associated with that step. Therefore the step associated with local maximum 20 and local minimum 36 is considered to have been taken at a chronological index of approximately 2.4 seconds.

In the next step 70, a step validation process is performed. Firstly, the magnitude of the local minimum associated with each detected step is compared with the magnitude of the chronologically subsequent and adjacent local maximum to determine a validation magnitude difference value. Additionally or alternatively, the chronological index of the local minimum associated with each detected step is compared with the chronological index of the chronologically subsequent and adjacent local maximum to determine a validation chronological difference value. If the validation magnitude difference value is greater than a validation magnitude threshold value, and the validation chronological difference value is less than the validation chronological difference threshold value, the step associated with that local minimum is validated. Conversely, if the validation magnitude difference value is less than the validation magnitude threshold value, and/or the validation chronological difference value is greater than the validation chronological difference threshold value, the step associated with that local minimum is invalidated.

In an exemplary embodiment, the validation magnitude threshold value may be 2.5 ms$^{-2}$, while the validation chronological difference threshold value may be 900 ms. For the step associated with local maximum 20 and minimum 36, the validation magnitude difference value is approximately 16.5 ms$^{-2}$ while the validation chronological difference value is approximately 400 ms. The validation magnitude difference value is thus greater than the validation magnitude threshold value and the validation chronological difference value is less than the chronological difference threshold value. Accordingly, the step associated with local maximum 20 and minimum 36 is validated.

By comparing the local minimum from which a step has been detected to a chronologically subsequent local maximum which was not used to detect that step, further context is taken into account regarding the movements of the user which helps to validate or invalidate the detection of the one or more steps.

As an additional or alternative validation measure, a search for anomalies of step interval may be performed. In this case, chronological index intervals between chronologically adjacent detected steps may be determined. In practice, this typically involves calculating the difference in chronological index between the local minima associated with adjacent detected steps. In addition, a normalised chronological index interval may be determined by averaging all of the determined chronological index intervals. For example, the normalised chronological index interval may be the mean of all the determined chronological index intervals. Then, for each detected step, the controller 2 may determine whether a difference between the normalised chronological index interval and the chronological index interval between that step and a preceding detected step is within a predetermined range of the normalised chronological index interval. Additionally or alternatively, it may be determined whether the difference between the normalised chronological index interval and the chronological index interval between that step and a subsequent detected step is within a predetermined range of the normalised chronological index interval. If both of these intervals are within the predetermined ranges of the normalised chronological index interval, the detected step is validated. If either or both of these intervals are not within the respective predetermined ranges of the normalised chronological index interval, this step is invalidated.

By comparing the chronological index interval between chronologically adjacent steps with a normalised chronological index interval, outlier intervals can readily be identified and the steps associated with the outlier intervals can thus be invalidated before any motion vectors are generated (see below). This helps to improve the accuracy of the estimation of the updated position of the user device 1.

In the next step 72, the controller 2 determines the orientation of the user device during each validated detected step. In order to determine the orientation of the user device during a given step, directional measurements made by the compass 8 between the local maximum and local minimum associated with that step may be averaged (e.g. by taking the mean direction of the compass readings). If the compass reading of a validated detected step varies from the orientation of a preceding validated detected step by more than a predetermined threshold, measurements made by the gyroscope 6 between the two steps may be used to validate or invalidate the compass reading. For example, this may be done by integrating the gyroscope measurements taken between the local maximum and minimum associated with that step on a horizontal plane. If the compass reading is validated by the gyroscope measurements, the average compass direction will be validated as the direction of the step. If the compass reading is invalidated by the gyroscope measurements, the direction of the step will be taken to be the orientation of the user device during the preceding validated detected step.

Following detection and validation of the steps taken by the user, determination of the average stride length of the user, and the determination of the orientation of the user device from the compass/gyroscope measurements, a walk-path motion vector is generated in step 74 for each validated detected step. Each step is considered to have followed a distance equal to the average stride length in the direction derived from the orientation of the user device as described above. A plurality of the walk-path motion vectors may be subsequently combined if, for example, they indicate movement in the same direction. Once generated, the motion vectors are stored in a vector buffer of memory 12 for further processing (see below).

Typically, the walk-path motion vector is a 2D motion vector which describes movement of the user in two dimensions (typically a horizontal plane). However, one or more vertical motion indicators may also be derived from the vertical acceleration data. For example, it has been empirically determined that, if all of the following three conditions are met, the user has moved vertically upwards:

$$A_{ave\_max} - A_{ave\_min} > 10$$

$$A_{ave\_min} > 4.2$$

$$A_{ave\_max} < 16.2$$

where:
$A_{ave\_max}$ is the average magnitude of the local maxima detected in step 68; and
$A_{ave\_min}$ is the average magnitude of the local minima detected in step 68.

In addition, it has been empirically determined that, if both of the following two conditions are met, the user has moved vertically downwards:

$$A_{ave\_min} < 4.2$$

$$A_{ave\_max} > 16.2$$

$A_{ave\_min}$ and $A_{ave\_max}$ may be averaged over the time period to determine a vertical motion indicator over that time period. In this case, the vertical motion indicators indicate whether vertically up or vertically down movement has been performed by the user over the time period.

Such indicators typically provide binary assessments as to whether the user has moved upwards (e.g. climbed a set of stairs) or downwards (e.g. descended a set of stairs), but are not typically suitable for determining vertical position accurately.

The algorithm described by FIG. 3B may further comprise updating a vertical position of the user device (e.g. a label indicating on which floor of a building the user device is currently located). This vertical position may be determined from data input manually by a user (i.e. manual "check-in" data) indicating on which floor the user device is currently located. Alternatively, the vertical movement indicators may simply be used to determine whether the user has moved vertically upwards, vertically downwards or otherwise. Alternatively, the vertical position of the user device may be determined from another available positioning system such as a satellite positioning system. As another alternative, as described below, the vertical position of the user device may be determined from the vertical acceleration data and the principal direction data.

In step 76 it may be determined whether a user has moved to a different floor of a building in order to improve the estimate of the (particularly the vertical) position of the user device 1. In this step, the walk-path motion vectors generated from vertical acceleration and principal direction data generated by the user device over a particular time interval may be compared to reference data to determine whether a user has climbed or descended a set of stairs. The reference data typically comprises one or more candidate reference patterns, each candidate reference pattern comprising a plurality of motion vectors arranged in a specific order relating to the relative movements required by the user to ascend or descend a particular staircase within the building. In this case, two or more of the generated motion vectors are compared to the candidate reference patterns and, if the motion vectors conform to one of the one or more candidate reference patterns representative of a floor change, floor change data associated with the conforming reference pattern is retrieved from a database of floor change data stored within the memory 12. A vertical position of the user device may then be updated accordingly (see below).

Typically, only two or more motion vectors generated from data generated by the user device during the particular time interval may be compared to the reference patterns. The particular time interval may comprise one or more time periods, or one or more fractions of one or more time periods.

An exemplary reference pattern is illustrated in FIGS. 4A to 4C. FIGS. 4A and 4B are side and plan views of a staircase 80. In order to climb the staircase from point A to point C, a user must take a plurality of steps in one lateral direction (left on FIGS. 4A and 4B) before taking a plurality of steps in an opposite lateral direction (right on FIGS. 4A and 4B). This is illustrated by the reference pattern in FIG. 4C. The user must also move vertically upwards. Accordingly, if, for example, the relevant vertical indicators indicate vertically upwards motion between points A and C, the steps associated with three successive validated, detected steps (within the particular time interval) are generally in the left direction and the steps associated with three subsequent successive steps (within the particular time interval) are generally in the right direction, floor change data may be generated by the controller 2 indicating that the user has climbed the staircase 80. Conversely, the relevant vertical indicator(s) indicate vertically downwards motion between points C and A, the steps associated with three successive validated, detected steps (within the particular time interval) are in the left direction and the steps associated with three subsequent successive steps (within the particular time interval) are generally in the right direction floor change data may be generated by the controller 2 indicating that the user has descended the staircase 80. Prior knowledge of a user's current floor may also be used to determine or subsequently validate whether a user has climbed or descended a staircase. The floor change data is stored in the memory 12.

It will be understood that complete conformance of said motion vectors and the reference pattern is not necessary. In some embodiments, a minimum error (e.g. least squares error) algorithm may be employed to determine which of the reference patterns best matches the motion vectors. In some cases, the minimum error must be less than an error threshold for a conformance to be determined.

It will also be understood that some steps which extend neither in the left nor right directions may occur between the successive left and successive right steps to account for a landing (e.g. at point B) between the left and right parts of the staircase 80. In addition, it will be understood that only one vertical indicator may need to be analysed if all steps in the particular time interval are provided in the same time period. Alternatively, a plurality of vertical indicators may need to be analysed if the relevant steps occur in different time periods.

When the walk-path motion vectors have been determined and stored in the vector buffer, and the floor change data has been generated and stored in memory 12, an updated position of the user device 1 can be determined in step 78 by combining the motion vectors with the initial position of the user device 1 and by updating a label (e.g. floor number) on the user device 1 indicating which floor the user is currently on in accordance with the floor change data. This updated position may then be reported to the user, for example by updating a position indicator on a map displayed on the user device 1. The method of FIG. 3B may then return to step 60 so that the above steps may be repeated.

Preferably, for example to save power, step 76 may only be enabled in response to one or more vertical movement indicators which indicate that the user has moved up or down floors within a building in order to minimise the processing required.

Because the accelerometer 4, compass 6 and gyroscope 8 are provided internally to the user device 1, the user device 1 does not need to communicate with any external devices (e.g. satellites, wireless access points) or have access to a data communications network or a server in order to estimate its position. Accordingly, particularly but not exclusively, the method for estimating the position of the user device 1 illustrated in FIGS. 3A and 3B may be used when other position estimation technologies are unavailable (e.g. when no line of sight is present between the user device and satellites for satellite positioning, or when no known Wireless Access Points are in range of the user device or no access to a server via a data communications network is available) or the other position estimation technologies are not available to provide a greater accuracy than the method illustrated in FIGS. 3A and 3B.

The accelerometer 4 may be a 1 or 2-axis accelerometer arranged to detect vertical acceleration. Alternatively, the accelerometer 4 may be a 3-axis accelerometer operable to detect vertical acceleration.

As indicated above, the user device 1 may be operable to use positioning systems other than the satellite positioning system and the method described above using the accelerometer 4 and the compass 8/gyroscope 6. For example, the user device 1 may comprise an electromagnetic signal receiver module in electronic communication with the controller 2, the electromagnetic receiver module being operable to receive electromagnetic signals transmitted by electromagnetic signal sources (e.g. Wi-Fi, Bluetooth, GSM base stations, near-field-communication beacons etc) of known position. In this case, the controller 2 is operable to estimate the position of the user device 1, for example by triangulation (or by reference to a map of electromagnetic signal source fingerprint data). When an alternative positioning method, such as a satellite positioning system or an electromagnetic signal source based positioning system (or other suitable positioning system) is available to the user device 1, and that alternative positioning method meets one or more (absolute or relative) accuracy criteria (e.g. it is accurate to within a predetermined radius or it is of greater accuracy than the method of FIGS. 3A and 3B) the user device 1 may prioritise that/those alternative positioning methods over the method described in FIGS. 3A and 3B. The error of the position estimated using the method of FIGS. 3A and 3B may be estimated using the following formulae:

$$\text{Error}_{estimated\_position} = \text{Error}_{initial\_position} + \text{Accumulated\_Error}$$

$$\text{Acculumated\_Error} = N_{steps}/10 \text{ meters}$$

where $\text{Error}_{estimated\_position}$ is the estimated error in the position estimated using the method of FIGS. 3A and 3B; $\text{Error}_{initial\_position}$ is the estimated error in the initial position; Accumulated_Error is the estimated error accumulated during use of the method of FIGS. 3A and 3B; and $N_{steps}$ is the number of validated steps since the initial position.

Satellite positioning systems such as GPS typically provide estimates of the possible errors present in their position estimates. Accordingly, the estimated error provided by a satellite positioning system may be compared to $\text{Error}_{estimated\_position}$ in order to determine whether the satellite positioning system overcomes a relative accuracy criterion stipulating that the estimated error of the alternative positioning method must be less than $\text{Error}_{estimated\_position}$ for the alternative positioning method to be prioritised over the method described in FIGS. 3A and 3B. The estimated error provided by the satellite positioning system may additionally or alternatively be compared against one or more absolute accuracy criteria (e.g. accurate to within 20 meters) to determine whether the position estimates provided by the satellite positioning system should be prioritised over the method described in FIGS. 3A and 3B.

The possible errors present in the position estimates provided by a positioning system (e.g. a triangulation based positioning system) based on processing signals received from electromagnetic signal sources of known position, may be estimated locally by the user device 1. For example, although it will be understood that any suitable algorithm may be used, one such suitable algorithm would be a Best Candidate Set algorithm. In this case, the controller 2 calculates the n best estimates of the position of the user device 1 based on the electromagnetic signals received by the user device 1 (the best of the n best estimates typically being selected as the estimated position of the device). Next, the distances between the best estimate of the position of the user device 1 and all of the other (n−1) best estimates are calculated. These calculated distances are then processed to determine an average (e.g. mean) distance between the best estimate and the other (n−1) best estimates. This average distance is then returned as the estimated error in the estimated position of the device 1.

This estimated error can then of course be compared to $\text{Error}_{estimated\_position}$ to determine whether the said positioning system based on processing signals received from electromagnetic signal sources of known position meets the said relative accuracy criterion and/or against one or more absolute accuracy criteria in order to determine whether the said positioning system should be prioritised over the method described in FIGS. 3A and 3B.

The position of the user device estimated by the alternative positioning method may also need to be validated before it can be prioritised over the position estimated by the method of FIGS. 3A and 3B. This may involve estimating a second position of the user device using the alternative positioning method, comparing the second estimated position with the first estimated position made using the alternative positioning method to determine a difference value, and comparing the difference value to a threshold value. If the difference value is less than the threshold value, it may be determined that the first estimated position was not determined in error and can therefore be validated. If the difference value is greater than the threshold value, it may be determined that the first estimated position was determined in error and should therefore be invalidated, in which case the first estimated position may not be used to estimate the position of the user device.

The accuracy criteria may stipulate that the alternative positioning method needs to be more accurate than the positioning system of FIGS. 3A and 3B by a threshold amount (e.g. 10%, 20% or 30%) before the alternative positioning method is prioritised over the positioning system of FIGS. 3A and 3B.

The accuracy criteria may additionally or alternatively include an absolute accuracy criterion which stipulates that the estimated accuracy of the alternative positioning method must be accurate to a sufficient degree before said alternative positioning method is prioritised over the method of FIGS. 3A and 3B. For example, the alternative positioning method may need to be accurate to within a predetermined distance range (e.g. accurate to within a radius of 10 meters or 20 meters).

The method described in FIGS. 3A and 3B may thus further include the step of resetting the estimated position of the user device 1 using an alternative positioning method when such an alternative positioning method is available to a sufficient degree of accuracy. Alternatively, the method of FIGS. 3A and 3B may be interrupted when an alternative positioning method becomes available which meets the accuracy criteria. At this point, the buffer section of the memory 12 may be cleared. A position of the user device 1 determined from the alternative positioning method may then be used as the initial position in the method of FIGS. 3A and 3B, for example when said alternative positioning method(s) are unavailable to the user device 1 (e.g. in a railway tunnel where no line of sight is available between positioning satellites and the satellite positioning system receiver 10 of the user device 1), or when said alternative positioning method(s) do not meet said accuracy criteria, in which case the process of FIG. 3B resumes at step 60 and step 58 of FIG. 3A resumes.

It will be understood that the step 58 of FIG. 3A may continue in the background while other positioning systems are being used.

When an alternative positioning method meeting the one or more accuracy criteria is available, a position of the user device estimated by the alternative positioning method may be subsequently compared to an updated position of the user device (i.e. estimated using the method of FIGS. 3A and 3B, where vertical acceleration and principal direction data are processed together with an initial position) to determine one or more accuracy measurements of the updated position. If the one or more accuracy measurements of the updated position fail one or more second accuracy criteria (which may be different from the accuracy criteria mentioned above), the magnitude and/or chronological threshold values may be adjusted to improve the accuracy of subsequent position estimates of the user device using vertical acceleration and principal direction data together with an initial position. Additionally or alternatively, the estimated average stride length of the user may be updated to improve the accuracy of subsequent position estimates of the user device using vertical acceleration and principal direction data.

The one or more accuracy measurements typically comprise a measurement of the distance, and optionally a measurement of the direction, from the position estimated by the alternative positioning method. In this case, the one or more second accuracy criteria comprises a threshold distance value (and optionally a threshold direction value). If the accuracy measurement is (are) less than the threshold distance (and optionally threshold direction) values, the magnitude and chronological threshold values may be left unchanged. However, if the accuracy measurement(s) is (are) greater than the threshold distance (and optionally threshold direction) values, the magnitude and chronological threshold values may be adjusted accordingly.

In an exemplary embodiment, the position of the user device estimated by the alternative positioning method may first need to meet an absolute accuracy criterion as described above (e.g. be accurate to within a predetermined distance range, such as 20 meters). The difference between the position estimated using the alternative positioning method and the position estimated using the method of FIGS. 3A and 3B is then calculated and compared against one or more threshold adjustment criteria. The threshold adjustment criteria may comprise a threshold adjustment value. The threshold adjustment value may be derived from the estimated errors in the position estimated using the method of FIGS. 3A and 3B and/or the estimated errors in the position estimated using the alternative positioning method. For example, the threshold adjustment value may be calculated as follows:

$$2*(\text{Error}_{estimated\_position} + \text{Error}_{alternative\_positioning\_method})$$

where $\text{Error}_{estimated\_position}$ is as defined above; and $\text{Error}_{alternative\_positioning\_method}$ is the estimated error of the alternative positioning method.

As described above, where the alternative positioning method is a satellite positioning system, a measure of $\text{Error}_{alternative\_positioning\_method}$ is typically provided by the satellite positioning system. As also described above, where the alternative positioning method is (e.g. a triangulation based positioning system) based on processing signals received from electromagnetic signal sources of known position, $\text{Error}_{alternative\_positioning\_method}$ can be estimated by, for example, the Best Candidate Set algorithm described above.

If the difference is greater than or equal to the threshold adjustment value, the magnitude and/or chronological threshold values and/or the estimated average stride length of the user may need to be adjusted. However, as a final check before these parameters are adjusted, the position estimated using the alternative positioning method may need to be validated as described above prior to adjusting these parameters.

If the position estimated using the alternative positioning method is validated, a comparison is made to determine whether the position estimated using the alternative positioning method or the position estimated using the method of FIGS. 3A and 3B is closer to the initial position. If the position estimated using the alternative positioning method is closer to the initial position, the stride length coefficient, C, may be reduced (e.g. by a fixed factor such as 0.02) so as to reduce the estimated average stride length of the user. If the position estimated using the method of FIGS. 3A and 3B is closer to the initial position, the stride length coefficient, C, may be increased (e.g. by a fixed factor such as 0.02) so as to increase the estimated average stride length of the user. It will be understood that similar adjustments may additionally or alternatively be made to the magnitude and/or chronological threshold values.

The magnitude and/or chronological threshold values and/or the estimated average stride length of the user may be iterated over time to improve the accuracy of the updated position.

To maintain continuity between chronologically adjacent time periods, if the last turning point detected in a time period is a local maximum, this local maximum reading (i.e. the magnitude and chronological index of that local maximum) may be retained in memory 12 for use in step detection in the chronologically subsequent time period.

Optionally, the updated position determined by combining the initial position with the motion vectors can be used to create, update or correct a map of electromagnetic signal source (e.g. Wireless Access Point, WAP) positions. In this case, the user device 1 further comprises a wireless module operable to receive wireless signals conforming to one or more specific wireless standards (e.g. for example the Wi-Fi, Wi-Max, Bluetooth, Zigbee and/or near-field communications standards). When the user device 1 samples signals from the accelerometer 4, compass 8 and gyroscope 6, it may also sample wireless signals from (e.g. Wi-Fi, Wi-Max, Bluetooth, Zigbee and/or near-field compatible) electromagnetic signal sources which are within range of the user device 1. The user device 1 may then either store the signals and create, update or correct a map of electromagnetic signal source positions locally on the device or, more typically, the user device 1 will temporarily buffer the received electromagnetic signals before transmitting them to a server over a data communications network (such as the internet, e.g. via Wi-Fi, or a 2G, 2.5G, 3G or 4G mobile data communications network). In the latter case, the server creates, updates or corrects the map of electromagnetic signal source positions, and subsequently makes the (created, updated or corrected) map available to the user device 1. An example of determining the position of an electromagnetic signal source using triangulation is provided below with reference to FIG. 5. However, it will be understood that any suitable algorithm may be employed.

FIG. 5 is an illustration of the process of triangulating (in 2D) the position of an electromagnetic signal source. Three different scanning sites 90, 92, 94 are shown, each representing a different location at which the user device 1 detects a signal transmitted by an electromagnetic signal source located in the approximate region 96. The electromagnetic signal source/region 96 is at a distance $d_1$, $d_2$, $d_3$ from respective scanning sites 90, 92, 94. Each site 90, 92, 94 is surrounded by a circle representing the locus of all points at distance $d_n$.

Here, $d_n$ may be derived from any available distance measurement models. For example, the strength (power) of an electromagnetic signal received by the user device 1 may be described by following mathematical equation in free space:

$$Pr = \frac{P_t G_t G_r \lambda^2}{(4\pi)^2 d^2}$$

where $P_r$ is the received signal power from the WAP, $P_t$ is a transmitted power from the electromagnetic signal source, $G_r$ and $G_t$ are receiver and transmitter antenna gains respectively, $\lambda$ is a signal wavelength and d is a distance between source and receiver. This equation can also be represented in terms of propagation gain (PG) as:

$$PG = \frac{Pr}{P_t G_t G_r} = \left(\frac{\lambda}{4\pi d}\right)^2$$

and in decibels form as:

$$PG_{dB} = 20\log\left(\frac{\lambda}{4\pi d}\right)$$

The free space model (equations) cannot easily be applied in real world environments without modifications because of the signal propagation uncertainties. Electromagnetic signal propagation can be affected by many factors such as signal attenuations and reflections (multipath effects) from the surfaces, building types, moving objects and people, transmission frequency, antenna heights and polarisation, and so on. However, various models exist to try to model different environments and signal propagation behaviour through them to determine the distance between receiver and source. For example, there are models available to predict signal behaviour for different indoor environments. One of the indoor models is described by the following equation:

$$PG_{dB} = 20\log\left(\frac{\lambda}{4\pi d_0}\right) + 10n\log(d/d_0) + X_\sigma \text{ for } d > d_0$$

where X, n and $d_0$ are the parameters which vary with different indoor environments and which can be determined empirically. For example, the values of X, n and $d_0$ for a typical hard partitioned office environment are 7.0, 3.0 and 100 respectively.

User input can be provided to select types of environment and then to use specific values of the abovementioned parameters stored in memory (that were for example previously input by the user or other operator). Alternatively, if user inputs are not available, default values can be chosen from the software configuration.

There are also models available for outdoor environments for example. One such model, designated as Stanford University Interim (SUI) Model, is described by the following equation:

$$PL = 20\log\left(\frac{4\pi d_0}{\lambda}\right) + 10n\log\left(\frac{d}{d_0}\right) + X_f + X_h + s \text{ for } d > d_0$$

PL is described as path loss and other parameters can be processed similarly as described in for indoor models, that is (for example) either through user inputs or from software configuration.

In each of the above equations, when all other parameters are known, the distance d can be readily deduced to determine distances $d_n$. The distances $d_n$ may then be used together with location co-ordinates of sites 90, 92, 94 derived using the method of FIGS. 3A and 3B in the following equation:

$$d_i = \sqrt{(x_r - x_{si})^2 + (y_r - y_{si})^2}$$

where $d_i$ is the distance, $x_r$ and $y_r$ are the x and y co-ordinates of the electromagnetic signal source and $x_{si}$ and $y_{si}$ are the x and y co-ordinates of places, where i is 1, 2, ..., n. Three equations are formed and solved for x and y co-ordinates of the electromagnetic signal source in region 96. These equations can be solved with any available methods such as the least squares method.

As shown in FIG. 5, the mapped co-ordinates for the electromagnetic signal source in region 96 are where the three circles (the loci of the estimated distances between the sites and the electromagnetic signal source) overlap. The circles may not overlap at a single point because of errors in the measurement/estimation of the distances $d_1$, $d_2$, $d_3$ and possible errors in the reference (or estimated) co-ordinates of the scanning sites 90, 92, 94. However, it can be appreciated that approximate positions of electromagnetic signal sources within range of the user device 1 can be determined.

Where a map of electromagnetic signal positions (or any other suitable database of electromagnetic signal source positions) is provided or created, updated or corrected as explained above, electromagnetic signals received by the user device can be used to identify the vertical position of the user device without using the vertical acceleration or principal direction data. This can be done by: processing the received electromagnetic signals to extract identification data relating to the electromagnetic signal source(s); and comparing the identification information to the map of electromagnetic signal source positions (or any other suitable database of electromagnetic signal source positions) to extract a vertical position of each of the one or more electromagnetic signal sources (e.g. which floor of a building the electromagnetic signal source is located). Alternatively, the vertical positions of the electromagnetic signal sources may simply be comprised in the data transmitted by said sources, in which case said positions can be extracted simply by signal processing. The vertical positions of electromagnetic signal sources can then be compared with a currently estimated vertical position of the user device to determine whether the user device has changed floors. The vertical position of the user device may also be updated accordingly.

This method can be extended to generate reference patterns representative of floor changes made by the user device which can be used (as described above) to determine whether the user device has changed floors (for example but not exclusively in the absence of suitable electromagnetic signals being detected by the user device). Each reference pattern may be generated by identifying and storing two or more floor-change motion vectors generated in respect of validated steps taken by the user during the floor change. This may for example involve identifying the motion vectors generated from data generated by the user device during the particular time interval ending with the floor change.

It will be understood that the floor-change motion vectors, or data derived therefrom, may be used as a reference pattern.

Further modifications and variations may be made within the scope of the invention herein disclosed.

The invention claimed is:

1. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position; wherein processing the vertical acceleration data comprises identifying a plurality of local maxima and local minima of vertical acceleration and comparing each local maximum with a chronologically adjacent local minimum to detect whether a step has been taken by the user, wherein comparing each local maximum with a chronologically adjacent local minimum comprises comparing a magnitude of each local maximum with a magnitude of a chronologically subsequent local minimum to determine a magnitude difference value and comparing the magnitude difference value with a magnitude threshold value.

2. A method of estimating the position of a user device carried by a user according to claim 1 wherein comparing each local maximum with a chronologically adjacent local minimum comprises comparing a chronological index associated with each local maximum with a chronological index associated with a or the chronologically subsequent local minimum to determine a chronological difference value and comparing the chronological difference value with a chronological reference value.

3. A method of estimating the position of a user device carried by a user according to claim 1 wherein, for each local maximum and local minimum from which a step has been detected, validating the detection of said one or more steps comprises comparing the magnitude of each local minimum with the magnitude of a chronologically subsequent local maximum to determine a validation magnitude difference value and comparing the validation magnitude difference value to a validation magnitude threshold value.

4. A method of estimating the position of a user device carried by a user according to claim 1 wherein, for each local maximum and local minimum from which a step has been detected, validating the detection of said one or more steps comprises comparing a chronological index associated with each local minimum with a chronological index associated with a chronologically subsequent local maximum to determine a validation chronological difference value and comparing the validation chronological difference value to a validation chronological difference threshold value.

5. A method of estimating the position of a user device carried by a user according to claim 1 wherein a plurality of steps are detected, and wherein validating the detection of the plurality of steps comprises: determining a normalised chronological index interval between chronologically adjacent steps; comparing chronological index intervals between chronologically adjacent steps with the normalised chronological index interval; and validating the detection of each step if a difference between the normalised chronological index interval and the chronological index interval between that step and a preceding step is within a predetermined range of the normalised chronological index interval and/or the chronological index interval between that step and a subsequent step is within a predetermined range of the normalised chronological index interval.

6. A method of estimating the position of a user device carried by a user according to claim 1 wherein processing the vertical acceleration data comprises low pass filtering the vertical acceleration data.

7. A method of estimating the position of a user device carried by a user according to claim 1 further comprising updating a vertical position of the user device.

8. A method of estimating the position of a user device carried by a user according to claim 7 further comprising updating the vertical position of the user device using the vertical acceleration data and the principal direction data, or data derived therefrom.

9. A method of estimating the position of a user device carried by a user according to claim 1 further comprising: generating a plurality of motion vectors; and generating floor change data by comparing two or more of the plurality of motion vectors, or data derived from said two or more of the plurality of motion vectors, to reference data to determine whether the user device has changed floor within a building.

10. A method of estimating the position of a user device carried by a user according to claim 9 wherein the reference data comprises one or more candidate reference patterns, each candidate reference pattern comprising data representing a plurality of motion vectors arranged in a specific order relating to the relative movements required to ascend or descend a particular staircase within the building.

11. A method of estimating the position of a user device carried by a user according to claim 10 wherein the step of generating floor change data comprises: comparing said two or more motion vectors to one or more candidate reference patterns comprised in the reference data; determining that said two or more motion vectors conform to one of the one or more candidate reference patterns; and retrieving floor change data associated with said one of the one or more candidate reference patterns from a database of floor change data.

12. A method of estimating the position of a user device carried by a user according to claim 9 further comprising processing the vertical acceleration data to determine one or more vertical movement indicators and processing the one or more vertical movement indicators to indicate whether the user device has moved up or down floors within the building.

13. A method of estimating the position of a user device carried by a user according to claim 12 further comprising: enabling an algorithm for comparing said two or more motion vectors to reference data to determine whether the user device has changed floor within a building in response to one or more vertical movement indicators indicating that the user device has moved up or down floors.

14. A method of estimating the position of a user device carried by a user according to claim 9 comprising using the floor change data to update the vertical position of the user device.

15. A method of estimating the position of a user device carried by a user according to claim 1 further comprising processing the vertical acceleration data to determine an average stride length of the user and using the average stride length to generate the motion vector.

16. A method of estimating the position of a user device carried by a user according to claim 1 further comprising updating an estimated position of the user device using an alternative positioning method when said alternative positioning method is available and meets one or more accuracy criteria.

17. A method of estimating the position of a user device carried by a user according to claim 16 further comprising comparing a position of the user device estimated by the alternative positioning method to the updated position of the user device to determine one or more accuracy measurements of the updated position, and adjusting the magnitude and/or chronological threshold values and/or an or the estimated average stride length of the user if the accuracy measurement(s) fail(s) one or more second accuracy criteria.

18. A method of estimating the position of a user device carried by a user according to claim 1 further comprising receiving one or more signals from an electromagnetic signal source, processing the one or more received signals to estimate a position of the electromagnetic signal source using the updated position and creating, updating or correcting a database of electromagnetic signal source positions using the estimated position of the electromagnetic signal source.

19. A method of estimating the position of a user device carried by a user according to claim 1 further comprising: determining that the user device has changed floors within a building; and generating a reference pattern representative of the floor change performed by the user device by identifying and storing two or more motion vectors generated in respect of validated steps taken by the user during said floor change.

20. A method of estimating the position of a user device carried by a user according to claim 19 wherein the step of determining that the user device has changed floors within a building comprises: receiving one or more electromagnetic signals identifying one or more electromagnetic signal sources or a vertical position from which the electromagnetic signal(s) were transmitted; and processing the received electromagnetic signals to determine the vertical position of one or more electromagnetic signal sources.

21. A user device comprising a vertical acceleration measurement module operable to measure a vertical acceleration of the user device; an orientation measurement module operable to measure an orientation of the user device; and a controller in electronic communication with the vertical acceleration and orientation measurement modules, the controller being operable to: process vertical acceleration data generated by the vertical acceleration module to detect one or more steps taken by the user, and to subsequently validate the detection of one or more of said one or more steps; generate one or more motion vectors in respect of the validated steps taken by the user using principal direction data generated by the orientation measurement module; and estimate an updated position of the user device by combining the motion vector(s) with an initial position of the user device, wherein the controller is operable to process the vertical acceleration data by identifying a plurality of local maxima and local minima of vertical acceleration and comparing each local maximum with a chronologically adjacent local minimum to detect whether a step has been taken by the user, wherein comparing each local maximum with a chronologically adjacent local minimum comprises comparing a magnitude of each local maximum with a magnitude of a chronologically subsequent local minimum to determine a magnitude difference value and comparing the magnitude difference value with magnitude threshold value.

22. A user device according to claim 21 further comprising an alternative positioning system module in electronic communication with the controller for estimating a position of the user device.

23. A user device according to claim 22 wherein the alternative positioning system module comprises a satellite positioning system receiver.

24. A user device according to claim 22 wherein the alternative positioning system module comprises an electromagnetic signal receiver.

25. A method of estimating the position of a user device carried by a user, the method comprising: measuring an acceleration of the user device, thereby generating acceleration data; measuring a direction of movement of the user device, thereby generating direction data; processing the acceleration data to detect two or more steps taken by the user; generating two or more motion vectors relating to two or more of the detected steps taken by the user taking into account the direction data; and generating floor change data by comparing the said two or more motion vectors, or data derived from the said two or more motion vectors, with reference data to determine whether the user device has changed floors within a building, wherein the reference data comprises one or more candidate reference patterns, each candidate reference pattern comprising data representing a plurality of motion vectors arranged in as specific order relating to the relative movements required to change floors within the building, wherein the step of generating floor change data comprises: comparing said two or more generated motion vectors to one or more candidate reference patterns comprised in the reference data; determining that said two or more generated motion vectors conform to one of the one or more candidate reference patterns; and obtaining floor change data associated with said one of the one or more candidate reference patterns from a database of floor change data.

26. A method of estimating the position of a user device carried by a user according to claim 25 further comprising processing the acceleration data to determine one or more vertical movement indicators and processing the one or more vertical movement indicators to indicate whether the user device has moved up or down floors within the building.

27. A method of estimating the position of a user device carried by a user according to claim 26 further comprising: enabling an algorithm for comparing said two or more generated motion vectors to reference data to determine whether the user device has changed floor within a building in response to one or more vertical movement indicators indicating that the user device has moved up or down floors.

28. A method of estimating the position of a user device carried by a user according to claim 25 further comprising using the generated floor change data to update an estimated vertical position of the user device.

29. A non-transitory computer readable medium retrievably storing computer readable code for causing a computer to perform the steps of the method according to claim 25.

30. A user device comprising an acceleration measurement module configured to measure an acceleration of the user device; a direction measurement module configured to measure a direction of movement of the user device, thereby generating direction data; and a controller in electronic communication with the acceleration and direction measurement modules, the controller being configured to: process acceleration data generated by the acceleration module to detect two or more steps taken by the user; generate two or more motion vectors in respect of two or more of the detected steps taken by the user using the direction data generated by the direction measurement module; and to generate floor change data by comparing the said two or more motion vectors, or data derived from the said two or more motion vectors, with reference data to determine whether the user device has changed floors within a building, wherein the reference data comprises one or more candidate reference patterns, each candidate reference pattern comprising data representing a plurality of motion vectors arranged in a specific order relating to the relative movements required to change floors within the building, wherein the controller is configured to generate floor change data by: comparing said two or more generated motion vectors to one or more candidate reference patterns comprised in the reference data; determining that said two or more generated motion vectors conform to one of the one or more candidate reference patterns; and obtaining floor change data associated with said one of the one or more candidate reference patterns from a database of floor change data.

31. The user device according to claim 30 wherein the controller is configured to process the acceleration data to determine one or more vertical movement indicators and to process the one or more vertical movement indicators to indicate whether the user device has moved up or down floors within the building.

32. The user device according to claim 31 wherein the controller is configured to: enable an algorithm for comparing said two or more generated motion vectors to reference data to determine whether the user device has changed floor within a building in response to one or more vertical movement indicators indicating that the user device has moved up or down floors.

33. A user device according to claim 30 wherein the controller is configured to use the generated floor change data to update an estimated vertical position of the user device.

34. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein processing the vertical acceleration data comprises identifying a plurality of local maxima and local minima of vertical acceleration and comparing each local maximum with a chronologically adjacent local minimum to detect whether a step has been taken by the user, wherein comparing each local maximum with a chronologically adjacent local minimum comprises comparing a chronological index associated with each local maximum with a chronological index associated with a or the chronologically subsequent local minimum to determine a chronological difference value and comparing the chronological difference value with a chronological reference value.

35. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein a plurality of steps are detected, and wherein validating the detection of the plurality of steps comprises: determining a normalised chronological index interval between chronologically adjacent steps; comparing chronological index intervals between chronologically adjacent steps with the normalised chronological index interval; and validating the detection of each step if a difference between the normalised chronological index interval and the chronological index interval between that step and a preceding step is within a predetermined range of the normalised chronological index interval and/or the chronological index interval between that step and a subsequent step is within a predetermined range of the normalised chronological index interval.

36. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein the method further comprises: generating a plurality of motion vectors; generating floor change data by comparing two or more of the plurality of motion vectors, or data derived from said two or more of the plurality of motion vectors, to reference data to determine whether the user device has changed floor within a building, wherein the reference data comprises one or more candidate reference patterns, each candidate reference pattern comprising data representing a plurality of motion vectors arranged in a specific order relating to the relative movements required to ascend or descend a particular staircase within the building.

37. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein the method further comprises: generating a plurality of motion vectors; generating floor change data by comparing two or more of the plurality of motion vectors, or data derived from said two or more of the plurality of motion vectors, to reference data to determine whether the user device has changed floor within a building; processing the vertical acceleration data to determine one or more vertical movement indicators; and processing the one or more vertical movement indicators to indicate whether the user device has moved up or down floors within the building.

38. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein the method further comprises: updating an estimated position of the user device using an alternative positioning method when said alternative positioning method is available and meets one or more accuracy criteria and comparing a position of the user device estimated by the alternative positioning method to the updated position of the user device to determine one or more accuracy measurements of the updated position, and adjusting magnitude and/or chronological threshold values and/or an estimated average stride length of the user if the accuracy measurement(s) fail(s) one or more second accuracy criteria.

39. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein the method further comprises receiving one or more signals from an electromagnetic signal source, processing the one or more received signals to estimate a position of the electromagnetic signal source using the updated position and creating, updating or correcting a database of electromagnetic signal source positions using the estimated position of the electromagnetic signal source.

40. A method of estimating the position of a user device carried by a user, the method comprising: providing an initial position of the user device; measuring a vertical acceleration of the user device, thereby generating vertical acceleration data; measuring an orientation of the user device, thereby generating principal direction data; processing the vertical acceleration data to detect one or more steps taken by the user, and subsequently validating the detection of one or more of said one or more steps; generating one or more motion vectors in respect of the validated steps taken by the user using the principal direction data; and estimating an updated position of the user device by combining the motion vector(s) with the initial position, wherein the method further comprises: determining that the user device has changed floors within a building; and generating a reference pattern representative of the floor change performed by the user device by identifying and storing two or more motion vectors generated in respect of validated steps taken by the user during said floor change.

41. A method of estimating the position of a user device carried by a user, the method comprising: measuring an acceleration of the user device, thereby generating acceleration data; measuring a direction of movement of the user device, thereby generating direction data; processing the acceleration data to detect two or more steps taken by the user; generating two or more motion vectors relating to two or more of the detected steps taken by the user taking into account the direction data; and generating floor change data by comparing the said two or more motion vectors, or data derived from the said two or more motion vectors, with reference data to determine whether the user device has changed floors within a building, wherein the method further comprises: processing the acceleration data to determine one or more vertical movement indicators; processing the one or more vertical movement indicators to indicate whether the user device has moved up or down floors within the building; and enabling an algorithm for comparing said two or more generated motion vectors to reference data to determine whether the user device has changed floor within a building in response to one or more vertical movement indicators indicating that the user device has moved up or down floors.

42. A user device comprising an acceleration measurement module configured to measure an acceleration of the user device; a direction measurement module configured to measure a direction of movement of the user device, thereby generating direction data; and a controller in electronic communication with the acceleration and direction measurement modules, the controller being configured to: process acceleration data generated by the acceleration module to detect two or more steps taken by the user; generate two or more motion vectors in respect of two or more of the detected steps taken by the user using the direction data generated by the direction measurement module; and to generate floor change data by comparing the said two or more motion vectors, or data derived from the said two or more motion vectors, with reference data to determine whether the user device has changed floors within a building, wherein the controller is configured to process the acceleration data to determine one or more vertical movement indicators and to process the one or more vertical movement indicators to indicate whether the user device has moved up or down floors within the building and wherein the controller is configured to enable an algorithm for comparing said two or more generated motion vectors to reference data to determine whether the user device has changed floor within a building in response to one or more vertical movement indicators indicating that the user device has moved up or down floors.

\* \* \* \* \*